United States Patent
Shen et al.

(10) Patent No.: US 9,940,229 B2
(45) Date of Patent: Apr. 10, 2018

(54) TECHNOLOGIES FOR PERSISTENT MEMORY PROGRAMMING

(71) Applicant: Intel Corporation, Santa Clara, CA (US)

(72) Inventors: Xipeng Shen, Williamsburg, VA (US); Youfeng Wu, Palo Alto, CA (US); Cheng Wang, San Ramon, CA (US); Hyunchul Park, Santa Clara, CA (US); Hongbo Rong, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 556 days.

(21) Appl. No.: 14/496,621

(22) Filed: Sep. 25, 2014

(65) Prior Publication Data

US 2015/0169226 A1    Jun. 18, 2015

Related U.S. Application Data

(60) Provisional application No. 61/917,211, filed on Dec. 17, 2013.

(51) Int. Cl.
*G06F 12/02* (2006.01)

(52) U.S. Cl.
CPC .. *G06F 12/0238* (2013.01); *G06F 2212/7201* (2013.01); *G06F 2212/7202* (2013.01); *G06F 2212/7207* (2013.01)

(58) Field of Classification Search
None
See application file for complete search history.

(56) References Cited

U.S. PATENT DOCUMENTS

| | | | |
|---|---|---|---|
| 6,178,519 B1* | 1/2001 | Tucker | G06F 17/30607 707/999.01 |
| 2004/0193819 A1* | 9/2004 | Marinescu | G06F 12/0253 711/165 |
| 2013/0339671 A1* | 12/2013 | Williams, III | G06F 9/30043 712/217 |
| 2015/0006831 A1* | 1/2015 | Keshavamurthy | G06F 12/0246 711/157 |

* cited by examiner

Primary Examiner — Adam M Queler
Assistant Examiner — Dustin Bone
(74) Attorney, Agent, or Firm — Barnes & Thornburg LLP

(57) ABSTRACT

Technologies for persistent memory programming include a computing device having a persistent memory including one or more nonvolatile regions. The computing device may assign a virtual memory address of a target location in persistent memory to a persistent memory pointer using persistent pointer strategy, and may dereference the pointer using the same strategy. Persistent pointer strategies include off-holder, ID-in-value, optimistic rectification, and pessimistic rectification. The computing device may log changes to persistent memory during the execution of a data consistency section, and commit changes to the persistent memory when the last data consistency section ends. Data consistency sections may be grouped by log group identifier. Using type metadata stored in the nonvolatile region, the computing device may identify the type of a root object within the nonvolatile region and then recursively identify the type of all objects referenced by the root object. Other embodiments are described and claimed.

24 Claims, 14 Drawing Sheets

```
type Tree {
      persistentI Node* left;      ← 1202
      persistentI Node* right;
      Data data1;
} type Node {
      persistentI Node* left;      ← 1202
      persistentI Node* right;
      Data data2;
} type Array {
      persistentX Node* nodes[L];  ← 1204
} f() {
      persistent Tree* tree1;
      persistent Array* array1;    ← 1206
      persistent Node* node1;
                                                  ← 1208
      persistent NVRegion* region1 = NVOpenRegion("./treeRegion");
      persistent NVRegion* region2 = NVOpenRegion("./arrayRegion");

tree1 = (persistent Tree*) NVFetchRoot(region1, "tree1");
      if (!tree1) {
            NVLogCommit {
                  tree1 = NVNewRoot(region1, Tree, "tree1");  ← 1212
1210               node1 = NVNew(region1, Node);              ← 1214
                  tree1->AddChild(node1); // persistentI Node*
                  // . . .
            } // End of NVLogCommit           ← 1216
      } array1 = (persistent Array*) NVFetchRoot(region2, "array1");
      if (!array1) {
            NVLogCommit {
                  array1 = NVNewRoot(region2, Array, "array1");  ← 1220
1218              array1->nodes[0] = node1; // persistentX Node*
                  // . . .
            } // End of NVLogCommit           ← 1222
      }

NVLogCommit(getpid()) {
1224        tree1->balance();
      } // End of NVLogCommit(pid)

NVCloseRegion(region1);    ← 1226
      NVCloseRegion(region2);
}
```

FIG. 12

TECHNOLOGIES FOR PERSISTENT MEMORY PROGRAMMING

BACKGROUND

Typical computing systems include volatile memory such as random-access memory (RAM) coupled to persistent data storage such as hard disk drives or solid-state drives. Volatile memory requires a power source for operation; the contents of volatile memory may be lost when the power supply to a computing system is turned off. Persistent, or nonvolatile, storage retains its contents while power to the computing system is turned off.

Some computing systems include persistent memory, which may be byte-addressable, high-performance, non-volatile memory. Persistent memory may provide performance comparable to traditional volatile random access memory (RAM) while also providing data persistence. Computing systems may use persistent memory for program execution.

Executable code may be "position independent," meaning that the code may execute properly when mapped to different virtual address ranges. For example, a shared library may be mapped to a different virtual address range when linked to an executable. In some computing devices, executable code may be mapped to a different, sometimes random, virtual address range on every execution. For example, address space layout randomization (ASLR) is a computer security technique that may provide protection against buffer overflow attacks. Operating systems such as OS X, Linux, and Android 4.0 provide ASLR to help protect system and third party applications from exploits due to memory-management issues.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 12 is pseudocode representing code that may be compiled by the method of FIG. 11;

DETAILED DESCRIPTION OF THE DRAWINGS

Figure 1:
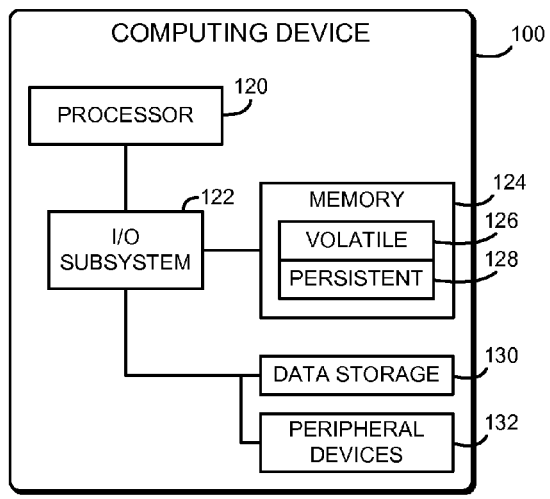
FIG. 1 is a simplified block diagram of at least one embodiment of a computing device for persistent memory programming.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or nonvolatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a computing device 100 for persistent memory programming includes both volatile and persistent memory that may be used to execute programs. In use, as discussed in more detail below, the computing device 100 may use several different strategies for implementing position-independent persistent memory pointers. Position-independent persistent memory pointers may allow programs to re-use data in persistent memory on different machines or across different runs of a process in the presence of address space layout randomization. Various position-independent persistent memory pointer strategies may provide different feature sets or performance attributes. In some embodiments, the computing device 100 may also designate data consistency sections in which changes to persistent memory may be atomically made consistent and durable. Data consistency sections may not require transactional memory support. The computing device 100 may also provide compiler support for position-independent persistent memory pointer strategies and data consistency sections. A programmer may select persistent memory programming features appropriate for a particular application. Additionally or alternatively, in some embodiments the computing device 100 may support type inference for data stored in persistent memory regions. Type inference may allow the computing device 100 to reuse persistent memory data in unrelated programs, or may allow the use of profiling or other performance analysis tools with persistent memory data.

The computing device 100 may be embodied as any type of computing device capable of performing the functions described herein, including, without limitation, a computer, a multiprocessor system, a server, a rack-mounted server, a blade server, a laptop computer, a notebook computer, a tablet computer, a smartphone, a mobile computing device, a wearable computing device, a network appliance, a web appliance, a distributed computing system, a processor-based system, and/or a consumer electronic device. As shown in FIG. 1, the computing device 100 includes a processor 120, an input/output subsystem 122, a memory 124, and a data storage device 130. Of course, the computing device 100 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 124, or portions thereof, may be incorporated in one or more processor 120 in some embodiments.

The processor 120 may be embodied as any type of processor capable of performing the functions described herein. For example, the processor may be embodied as a single or multi-core processor(s), digital signal processor, microcontroller, or other processor or processing/controlling circuit. Similarly, the memory 124 may be embodied as any type of volatile or nonvolatile memory or data storage capable of performing the functions described herein. In operation, the memory 124 may store various data and software used during operation of the computing device 100 such as operating systems, applications, programs, libraries, and drivers.

The memory 124 further includes volatile memory 126 and persistent memory 128. The volatile memory 126 may be embodied as traditional RAM, meaning that any data contained in the volatile memory 126 is lost when power is removed from the computing device 100 and/or the volatile memory 126. The persistent memory 128 may be embodied as any byte-addressable, high-performance, nonvolatile memory. For example, the persistent memory 128 may be embodied as battery-backed RAM, phase-change memory, spin-transfer torque RAM, resistive RAM, memristor-based memory, or other types of persistent memory. The persistent memory 128 may include programs and data similar to the volatile memory 126; however, the contents of the persistent memory 128 are retained for at least some period of time when power is removed from the computing device 100 and/or the persistent memory 128. In some embodiments, the memory 124 may include only persistent memory 128; however, in those embodiments a portion of the persistent memory 128 may be used to store volatile data similar to volatile memory 126.

The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 130 may be embodied as any type of device or devices configured for short-term or long-term storage of data such as, for example, memory devices and circuits, memory cards, hard disk drives, solid-state drives, or other data storage devices. Access to the data storage device 130 may be much slower than to the persistent memory 128. Additionally, the data storage device 130 may be accessed through a block device, file system, or other non-byte-addressable interface.

In some embodiments, the computing device 100 may also include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, network interface, and/or other input/output devices, interface devices, and/or peripheral devices.

Figure 2:
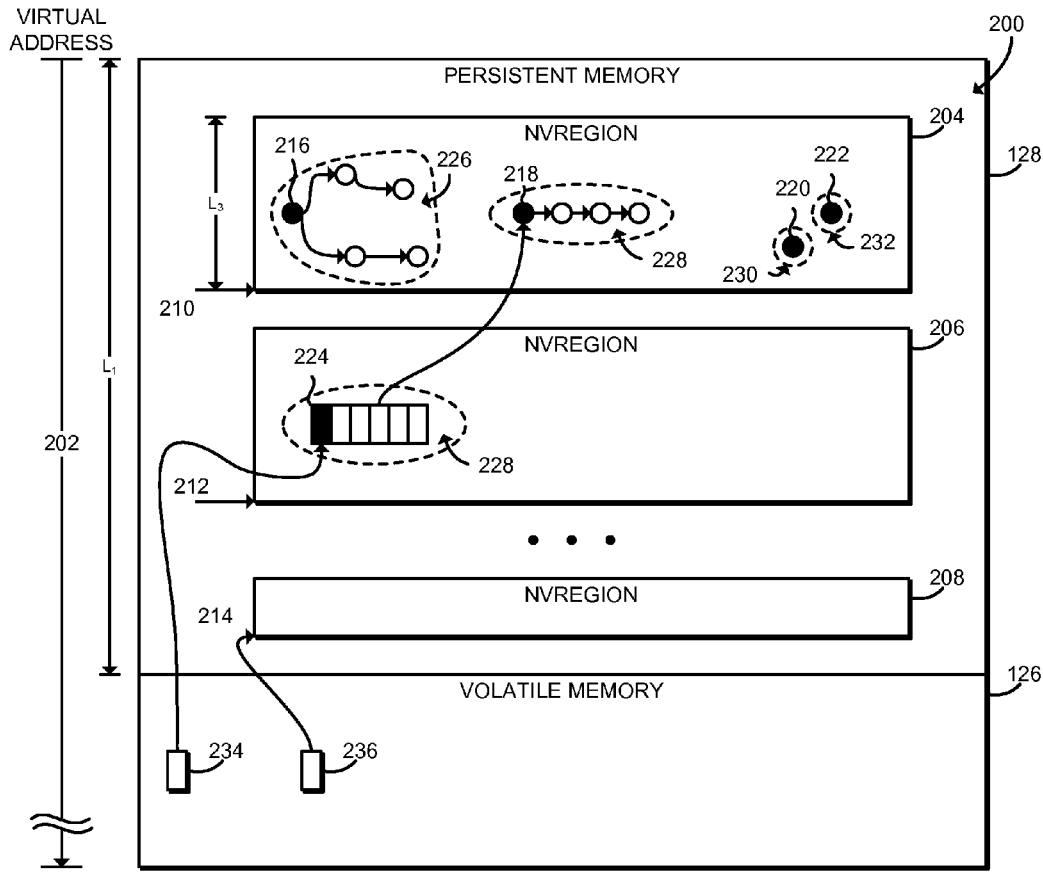
FIG. 2 is a schematic diagram illustrating a memory model for persistent memory programming that may be established by the computing device of FIG. 1.

Referring now to FIG. 2, the schematic diagram 200 illustrates one embodiment of a memory model for persistent memory programming that may be supported by the computing device 100. In this model, the persistent memory 128 and the volatile memory 126 are both mapped within a single virtual address space 202. Memory locations within the virtual address space 202 may be identified using a single virtual memory address, also known as a linear address. For example, in some embodiments the virtual address space 202 may establish a 64-bit address space, and locations within the virtual address space 202 may be addressed using 64-bit virtual memory addresses. The persistent memory 128 may be mapped to the upper segment of the virtual address space 202. In some embodiments, the upper $L_1$ bits of the address space 202 may be mapped to the persistent memory 128. In other words, the most-significant $L_1$ bits of every virtual address within the persistent memory 128 may be set to '1.'

The persistent memory 128 may be subdivided into one or more regions 204, 206, 208 known as nonvolatile regions or "NVRegions." Each of the NVRegions is a contiguous section of virtual memory with the same maximum size. For example, in the illustrative embodiment, the maximum size of each NVRegion occupies $L_3$ bits of the virtual address space 202. Each NVRegion may be created by an executing program, and then opened by the same program or by a different program. In some embodiments, NVRegions may also enforce security policies, for example by enforcing filesystem-style access controls when creating, opening, or otherwise accessing NVRegions. Each NVRegion starts at a virtual base address within the virtual address space 202. In the illustrative example, the NVRegion 204 starts at virtual base address 210, the NVRegion 206 starts at the virtual base address 212, and the NVRegion 208 starts at the virtual base address 214. The virtual base addresses may be aligned in memory based on the maximum size of each NVRegion. Thus, in the illustrative embodiment, each of the virtual base addresses corresponds to a virtual address with $L_3$ least-significant bits set to '0.' In some embodiments, the virtual base address assigned to each NVRegion may change. For example, the virtual base address may change when an NVRegion is opened by a different program, or the virtual base address may change between runs of the same program by a computing device 100 that supports address space layout randomization (ASLR).

Each NVRegion may include zero or more NVRoots, which may be embodied as named entities corresponding to data stored within the persistent memory 128. For example, an NVRoot may correspond to a programming object created with an object-oriented programming language such as C++ or Java. In the illustrative embodiment, the NVRegion 204 includes four NVRoots 216, 218, 220, 222, and the NVRegion 206 includes one NVRoot 224. Each NVRegion may maintain a root map or other metadata to track and reference any NVRoots stored within the NVRegion. Other data stored within each NVRegion may be reached through regular strides or pointer chasing starting with an NVRoot. The data reachable from an NVRoot is an NVSet. For example, the NVRoot 216 is the root node of a tree structure. That tree structure is included in the NVSet 226. The NVRoot 218 is the first node in a list structure, and that list is included in the NVSet 228. Each of the NVRoots 220, 222 are variables that are included in the NVSets 230, 232, respectively. The NVRoot 224 stored in the NVRegion 206 is the first element of an array, and the array is included in the NVSet 228. Note that an element of the array references the NVRoot 218 stored in the NVRegion 204. Thus, the NVSet 228 includes data stored in two different NVRegions 204, 206.

As shown in the diagram 200, the persistent memory 128 may include references defined between data items. Those references may be embodied as pointers that are stored in the persistent memory 128 and target memory locations in the persistent memory 128, also known as persistent pointers or persistent memory pointers. For example, the tree data structure in the NVSet 226 and the list data structure in the NVSet 228 may be implemented using persistent pointers to memory locations within the same NVRegion 204, also known as intra-region persistent pointers. As another example, the array in the NVSet 228 may be implemented using persistent pointers located in the NVRegion 206 and pointing to memory locations within a different NVRegion 204, also known as inter-region persistent pointers. Additionally, pointers may be stored in the volatile memory 126 that point to locations within the persistent memory 128. For example, in the illustrative embodiment the pointer 234 points to the NVRoot 224, and the pointer 236 points to the virtual base address 214 of the NVRegion 208. Additionally or alternatively, in some embodiments the persistent memory 128 may include pointers (not shown) that target locations within the volatile memory 126.

Figure 3:
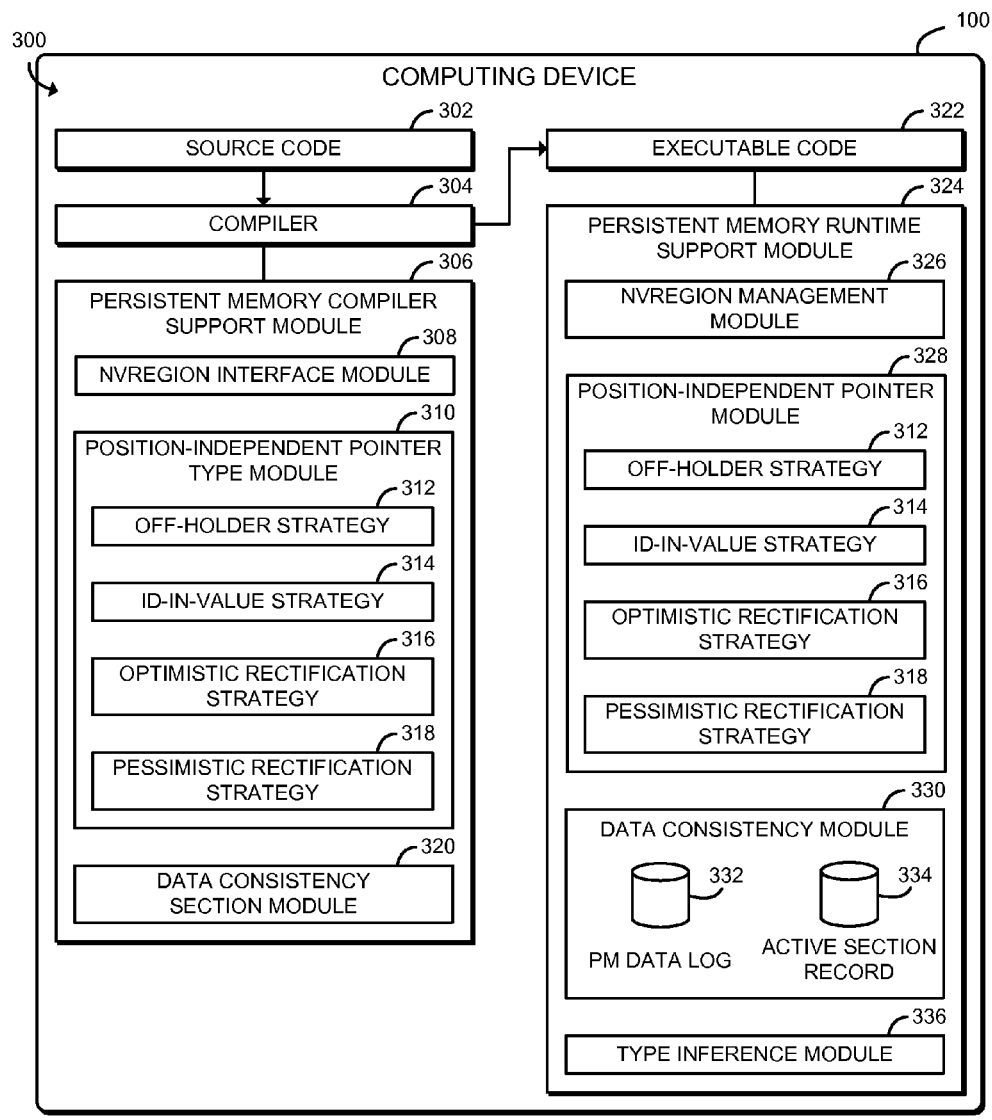
FIG. 3 is a simplified block diagram of at least one embodiment of an environment of the computing device of FIG. 1.

Referring now to FIG. 3, in an illustrative embodiment, the computing device 100 establishes an environment 300 during operation. The illustrative environment 300 includes source code 302, a compiler 304, a persistent memory compiler support module 306, executable code 322, and a persistent memory runtime support module 324. The various modules of the environment 300 may be embodied as hardware, firmware, software, or a combination thereof. For example, one or more of the modules, logic, and other components of the environment 300 may form a portion of, or otherwise be established or executed by, the processor 120 or other hardware components of the computing device 100.

The source code 302 includes symbols that may be translated into machine-executable code. The source code 302 may include typical source code features such as executable statements, control flow statements, data structures, and the like. Additionally, the source code 302 may include one or more commands, directives, or other requests to manipulate data stored in the persistent memory 128. For example, the source code 302 may include one or more persistent pointer accesses (e.g., assigning or dereferencing a persistent pointer), one or more persistent memory data consistency sections, or other operations on data stored in the persistent memory 128. The source code 302 may be embodied as C or C++ code, FORTRAN code, Java code, C# code, Objective C code, bytecode, assembly code, or any other computer code accepted by the compiler 304.

The compiler 304 is configured to process the source code 302 and produce the executable code 322. The compiler 304 may process the source code 302 in stages, for example, first parsing the source code 302 to build an intermediate representation of the source code 302, then optimizing the intermediate representation of the source code 302, and last generating executable code 322 based on the intermediate representation. The compiler 304 may detect the manipulation of data stored in the persistent memory 128 and generate appropriate output code using the persistent memory compiler support module 306.

The persistent memory compiler support module 306 is configured to allow the compiler 304 to understand commands in the source code 302 relating to manipulation of data in the persistent memory 128 and to generate appropriate output code for those commands. The persistent memory compiler support module 306 may include sub-modules to perform those tasks, including an NVRegion interface module 308, a position-independent pointer type module 310, and a data consistency section module 320. In some embodiments, all or part of the persistent memory compiler support module 306 may be incorporated in the compiler 304.

The NVRegion interface module 308 is configured to provide a programmatic interface to manage NVRegions within the persistent memory 128. The NVRegion interface module 308 may be embodied as an application programming interface (API), system call interface, or other programmatic interface that allows the source code 302 to request the creation of NVRegions, loading of existing NVRegions, creation of NVRoots within the NVRegions, and other persistent memory programming operations.

The position-independent pointer type module 310 is configured to provide an interface for the source code 302 to provide position-independent pointers within the persistent memory 128 and to generate associated output code. As described above, in some embodiments, a particular NVRegion may be mapped to different virtual memory address ranges between runs by the same program or when executed by different programs. The position-independent pointer type module 310 allows the source code 302 to include references to memory locations within the persistent memory 128 that remain valid even when the NVRegion is mapped to a different virtual memory address range. The position-independent pointer type module 310 may support several different strategies for providing position-independent pointers, and may be configured to allow the source code 302 to specify the strategy to be used. For example, the position-independent pointer type module 310 may provide a static type system that allows the source code 302 to specify particular persistent memory pointer strategies. Supported strategies may include an off-holder strategy 312, described below in connection with FIG. 5, an ID-in-value strategy 314, described below in connection with FIGS. 6-8, an optimistic rectification strategy 316, described below in connection with FIGS. 9A and 9B, and a pessimistic rectification strategy 318, also described below in connection with FIGS. 9A and 9B.

The data consistency section module 320 is configured to provide an interface for the source code 302 to delimit particular source code sections as data consistency sections and to generate associated output code. As described further below in connection with FIG. 10, a data consistency section ensures that changes to the persistent memory 128 are not made permanent until after the end of the data consistency section. After the end of the data consistency section, the changes to the persistent memory 128 are committed atomically. Thus, the data consistency section may allow the computing device 100 enforce data consistency for the persistent memory 128 in response to unexpected failures.

The executable code 322 includes machine-executable code generated by the compiler 304 based on the source code 302. The executable code 322 may include one or more function calls, code segments, subroutines, or other operations that manipulate data stored in the persistent memory 128. To manipulate the persistent memory 128, the executable code 322 may reference, call, incorporate, or otherwise use the persistent memory runtime support module 324. The executable code 322 may be embodied as binary code directly executable on a computing device, binary object code that may be linked with other code to produce an executable, precompiled header files that may be incorporated into an executable, or any other output file typically produced by a compiler. In some embodiments, the executable code 322 may include bytecode targeted to a virtual machine, and the bytecode may be interpreted by a computing device or "just-in-time" compiled for execution by a computing device. The executable code 322 may be targeted to a particular computer instruction set or otherwise targeted to the architecture of a particular computing device. In some embodiments, the executable code 322 may be executable by the computing device 100 itself. In other embodiments, the executable code 322 may be executable by a target computing device other than the computing device 100 (not shown). In such embodiments, the compiler 304 may be a so-called "cross compiler."

The persistent memory runtime support module 324 is configured to provide runtime support routines to allow the executable code 322 to manipulate data in the persistent memory 128. The persistent memory runtime support module 324 may include sub-modules to perform those tasks, including an NVRegion management module 326, a position-independent pointer module 328, a data consistency module 330, and a type inference module 336. In some embodiments, all or part of the persistent memory runtime support module 324 may be incorporated in the executable code 322.

The NVRegion management module 326 is configured to provide a runtime interface to manage NVRegions within the persistent memory 128. The NVRegion management module 326 may be embodied as a shared library, system call interface, or other runtime interface that allows the executable code 322 to request the creation of NVRegions, loading of existing NVRegions, creation of NVRoots within the NVRegions, and other persistent memory programming operations. In some embodiments, the NVRegion management module 326 may also initialize data structures, modify fields within the NVRegion, or otherwise prepare the NVRegion for use by the executable code 322. For example, as described below, the NVRegion management module 326 may initialize data structures for use by particular persistent memory pointer strategies.

The position-independent pointer module 328 is configured to allow the executable code 322 to access position-independent pointers within the persistent memory 128. For example, the position-independent pointer module 328 may provide routines to assign to persistent memory pointers and to dereference persistent memory pointers. Assigning and dereferencing a persistent memory pointer translates between the persistent memory pointer value and a virtual address of the target of the persistent memory pointer that may be used to access the data stored at the target. Similar to the position-independent pointer type module 310, the position-independent pointer module 328 may support several different strategies for accessing position-independent pointers. In particular, the position-independent pointer module 328 may support some or all of the same persistent memory pointer strategies supported by the position-independent pointer type module 310, including the off-holder strategy 312, the ID-in-value strategy 314, the optimistic rectification strategy 316, and the pessimistic rectification strategy 318.

The data consistency module 330 is configured to monitor the executable code 322 for data consistency sections and, during execution of a data consistency section, log all changes to the persistent memory 128 in a persistent memory data log 332. If the data consistency section is successfully completed, the data consistency module 330 may atomically commit all of the changes from the persistent memory data log 332 to the persistent memory 128. If an unexpected failure occurs during execution of the data consistency section, the data consistency module 330 may reverse any changes to the persistent memory 128 using the persistent memory data log 332. The data consistency module 330 may record the active data consistency sections in an active section record 334. The data consistency module 330 may only commit changes to the persistent memory 128 when the last active data consistency section is completed. Thus, the data consistency module 330 may enforce an outermost logcommit section policy, which may improve data consistency.

The type inference module 336 is configured to infer the types of all data stored within an existing NVRegion when the NVRegion is loaded. The type inference module 336 may identify an NVRoot object within the NVRegion using a root map stored in metadata of the NVRegion. The type inference module 336 may also identify the type of the NVRoot object using the root map. The type inference module 336 may retrieve a type definition for the type of the NVRoot object from type metadata also stored in the NVRegion. The type inference module 336 may use the type definition to interpret the NVRoot object and the variables, elements, fields, or other subunits included in the NVRoot object. To interpret the object and its variables, the type inference module 336 may identify the bounds of each object and/or variable within the persistent memory 128 and assign a type to each object and/or variable. The type inference module 336 may then recursively interpret every object referenced by a reference variable of the NVRoot object. Inferring the types of data stored within an existing NVRegion may allow persistent memory data to be re-used by unrelated applications, including applications developed by third parties or generalized performance, profiling, or analysis applications.

Figure 4:
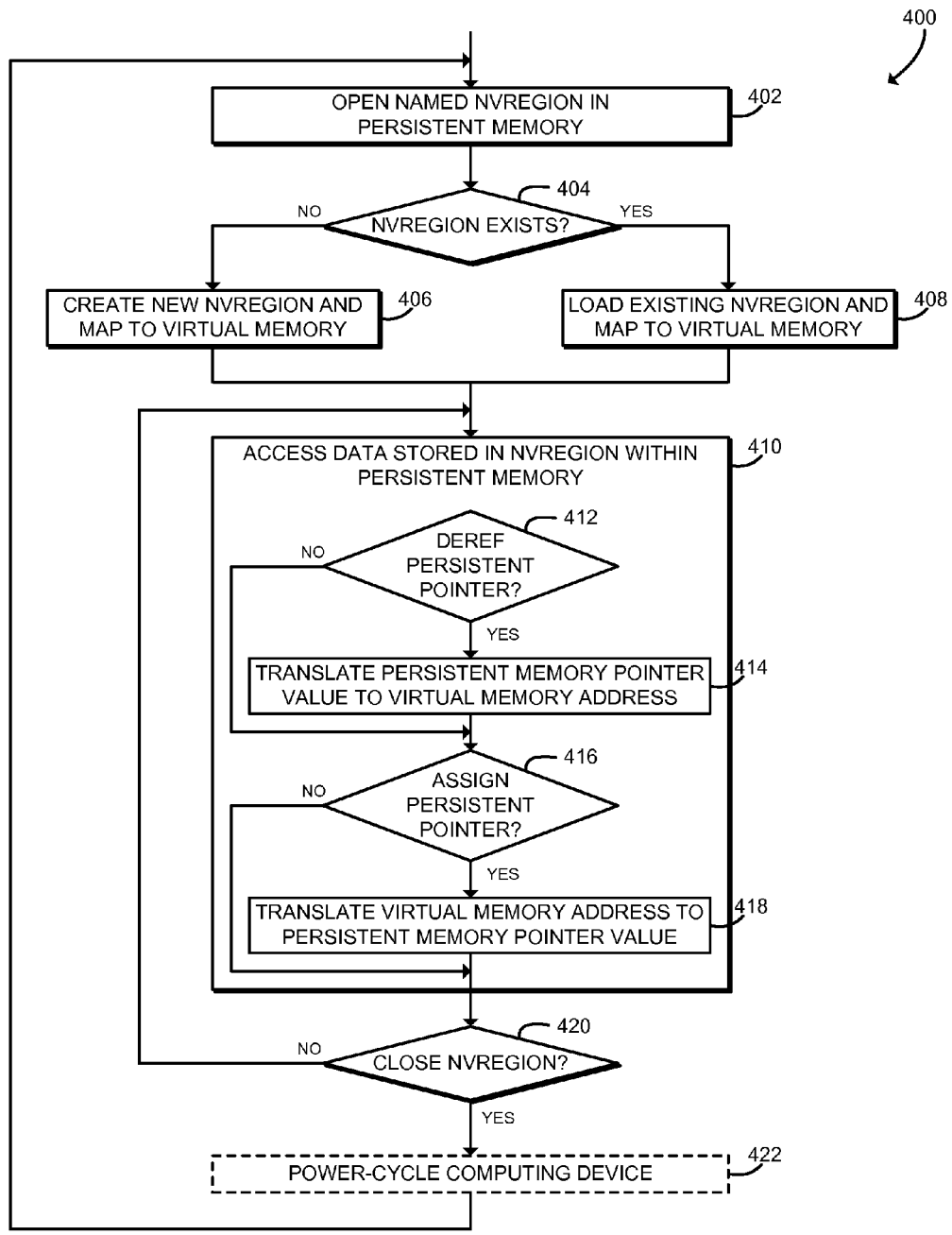
FIG. 4 is a simplified flow diagram of at least one embodiment of a method for persistent memory programming that may be executed by the computing device of FIGS. 1 and 3.

Referring now to FIG. 4, in use, a computing device 100 may execute a method 400 for persistent memory programming. The method 400 illustrates a general lifecycle of a persistent memory program, and thus all processes of the method 400 may not be performed in every embodiment. The method 400 begins in block 402, in which the computing device 100 opens a named NVRegion within the persistent memory 128. The computing device 100 may open the NVRegion in response to an application programming interface (API) call, system call, or other command generated by a running process. The name of the NVRegion may be embodied as any textual string, path, address, number, or other identifier that uniquely identifies an NVRegion within the persistent memory 128. Thus, the name of the NVRegion may be used to reference the NVRegion when the NVRegion has not yet been mapped to virtual memory or when the NVRegion may change location in virtual memory. In block 404, the computing device 100 determines whether the named NVRegion already exists. For example, the NVRegion may have been previously created in an earlier run of the current process or by another process. If the NVRegion does not exist, the method 400 branches to block 406. If the NVRegion does exist, the method 400 branches to block 408.

In block 406, the computing device 100 creates a new NVRegion with the requested name and maps the new NVRegion to virtual memory. The computing device 100 may perform any initialization required for the NVRegion such as initializing metadata, root maps, or other data structures associated with the NVRegion. The computing device 100 may automatically map the new NVRegion to a free segment of virtual memory, or may map the new NVRegion to a virtual base address supplied by the executing process. After being created, the NVRegion is ready for use by the currently executing process, and the method 400 advances to block 410.

Referring back to block 404, if the requested NVRegion already exists, the method 400 branches to block 408. In block 408, the computing device 100 loads the existing NVRegion and maps the NVRegion to virtual memory. The computing device 100 may load and map the NVRegion by setting up page tables or other data structures relating to virtual memory accesses. While loading an existing NVRegion, the computing device 100 may not copy, move, or otherwise change the physical location of the NVRegion within the persistent memory 128. Similar to a new NVRegion, the computing device 100 may automatically map the existing NVRegion to a free segment of virtual memory, or may map the existing NVRegion to a virtual base address supplied by the executing process. Thus, the NVRegion may be mapped to a different range of virtual addresses between runs or when used by different processes. After being loaded, the NVRegion is ready for use by the currently executing process, and the method 400 advances to block 410.

In block 410, the computing device 100 accesses data stored in the NVRegion within the persistent memory 128. In particular, as described above in connection with FIG. 3, the computing device 100 may access one or more persistent pointers stored in the persistent memory 128. During execution, in block 412, the computing device 100 determines whether to dereference a persistent pointer. Dereferencing the persistent pointer allows the computing device 100 to find a virtual address of the target of the persistent pointer. The computing device 100 may dereference persistent pointers in response to high-level language programming constructs, API or system calls, low-level instructions generated by a compiler or assembler, or any other request to dereference a persistent pointer. Thus, the determination of whether to dereference the persistent pointer may be determined using compiler or language support as described below in connection with FIG. 11. If the computing device 100 determines not to dereference a persistent pointer, the method 400 branches ahead to block 416. If the computing device 100 determines to dereference the persistent pointer, the method 400 advances to block 414.

In block 414, the computing device 100 translates the value of the persistent pointer to a virtual memory address that may be used to access the target location in persistent memory 128. Translating persistent pointer values to virtual memory addresses may allow for position-independent persistent pointers. The computing device 100 may use any appropriate persistent pointer strategy, format, or encoding scheme for translating the persistent pointer value. In some embodiments, the computing device 100 may use different strategies for intra-region persistent pointers and inter-region persistent pointers. The computing device 100 may select the pointer strategy at runtime or at compile time, for example using compiler support as described below in connection with FIG. 11. Various strategies for dereferencing persistent pointers are discussed in more detail below in connection with FIGS. 5-9.

In block 416, the computing device 100 determines whether to assign a virtual memory address to a persistent pointer. Assigning to the persistent pointer may allow the computing device 100 to build a data structure or other relationship between data stored in persistent memory 128. Similar to dereferencing the persistent pointer, the computing device may assign persistent pointers in response to high-level language programming constructs, API or system calls, low-level instructions generated by a compiler or assembler, or any other request to assign a persistent pointer. If the computing device 100 determines not to assign a persistent pointer, the method 400 branches ahead to block 420. If the computing device 100 determines to assign the persistent pointer, the method 400 advances to block 418.

In block 418, the computing device 100 translates the virtual memory address to a value that may be stored in the persistent pointer. Similar to pointer dereferencing, the computing device 100 may use any appropriate persistent pointer strategy, format, or encoding scheme for translating the virtual memory address. In some embodiments, the computing device 100 may use different strategies for intra-region persistent pointers and inter-region persistent pointers. The computing device 100 may select the pointer strategy at runtime or at compile time, for example using compiler support as described below in connection with FIG. 11. Various strategies for assigning persistent pointers are discussed in more detail below in connection with FIGS. 5-9.

In block 420, the computing device 100 determines whether to close the NVRegion. The computing device 100 may close the NVRegion in response to an API call, a system call, or other instruction, in response to the current process exiting, or in response to similar events. If the computing device 100 determines not to close the NVRegion, the method 400 loops back to block 410 to continue accessing data within the NVRegion. If the computing device 100 determines to close the NVRegion, then the method 400 advances to block 422.

In block 422, in some embodiments the computing device 100 may be power-cycled. For example, the computing device 100 may be reset, restarted, powered down, or otherwise power-cycled. Power-cycling the computing device 100 may clear the volatile memory 126. However, as described above, the contents of the persistent memory 128 are retained across power cycles. After potentially power-cycling the computing device 100, the method 400 loops back to block 402 to continue opening NVRegions and accessing the data contained within.

Figure 5:
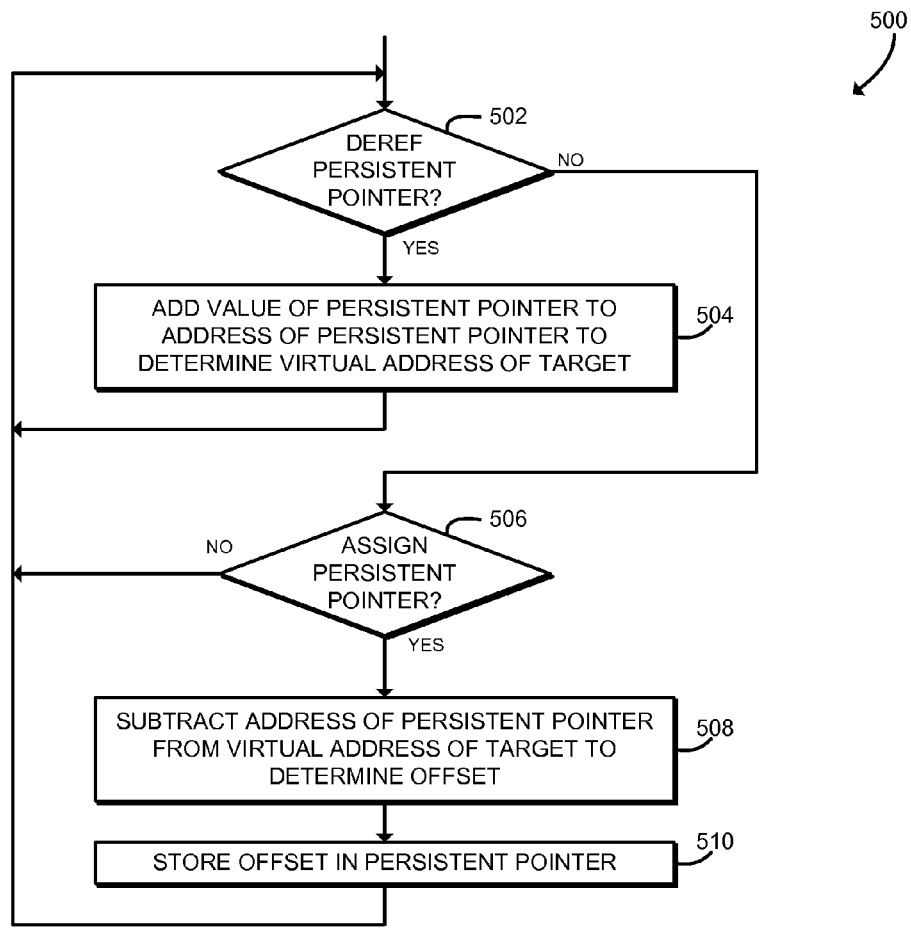
FIG. 5 is a simplified flow diagram of at least one embodiment of a method for persistent memory pointer access that may be executed by the computing device of FIGS. 1 and 3.

Referring now to FIG. 5, in use, the computing device 100 may execute a method 500 for persistent pointer access. The method 500 may represent a persistent pointer strategy that may be executed by the computing device 100 when accessing data within an NVRegion, for example as described above in connection with block 410 of FIG. 4. In particular, the method 500 may represent a persistent pointer strategy known as the "off-holder" strategy, useable for intra-region persistent pointers. The method 500 begins in block 502, in which the computing device 100 determines whether to dereference a persistent pointer. The computing device 100 may dereference a persistent pointer in response to high-level language programming constructs, API or system calls, low-level instructions generated by a compiler or assembler, or any other request to dereference a persistent pointer. If the computing device 100 determines not to dereference a pointer, the method 500 branches ahead to block 506. If the computing device 100 determines to dereference a pointer, the method 500 advances to block 504.

In block 504, the computing device 100 adds the value of the persistent pointer to the virtual address of the persistent pointer to determine the virtual address of the target of the persistent pointer. In other words, the persistent pointer value represents the offset between the persistent pointer and the target in virtual memory space. Thus, the virtual address of the target may be determined independently of the location of the NVRegion within virtual address space. Additionally, the virtual memory address may be determined without storing or referring to the virtual base address of the NVRegion. Of course, because the relative positions of NVRegions may change, this persistent pointer strategy may only be used for intra-region pointer accesses. After dereferencing the persistent pointer, the method 500 loops back to block 502 to perform additional persistent memory operations.

Referring back to block 502, if the computing device 100 determines not to dereference a persistent pointer, the method 500 branches ahead to block 506. In block 506, the computing device 100 determines whether to assign a virtual memory address to a persistent pointer. The computing device 100 may assign a persistent pointer in response to high-level language programming constructs, API or system calls, low-level instructions generated by a compiler or assembler, or any other request to assign a persistent pointer. If the computing device 100 determines not to assign a pointer, the method 500 loops back to block 502 to perform additional persistent memory operations. If the computing device 100 determines to assign a pointer, the method 500 advances to block 508.

In block 508, the computing device 100 subtracts the address of the persistent pointer from the virtual memory address to determine an offset value. In block 510, the computing device 100 stores the offset value in the persistent pointer. Thus, the value stored in the persistent pointer may be determined independently of the location of the NVRegion within virtual address space. Additionally, the offset value may be determined without storing or referring to the virtual base address of the NVRegion. Of course, because the relative positions of NVRegions may change, this persistent pointer strategy may only be used for intra-region pointer accesses. After storing the offset value in the persistent pointer, the method 500 loops back to block 502 to continue performing virtual memory operations.

Figure 6:
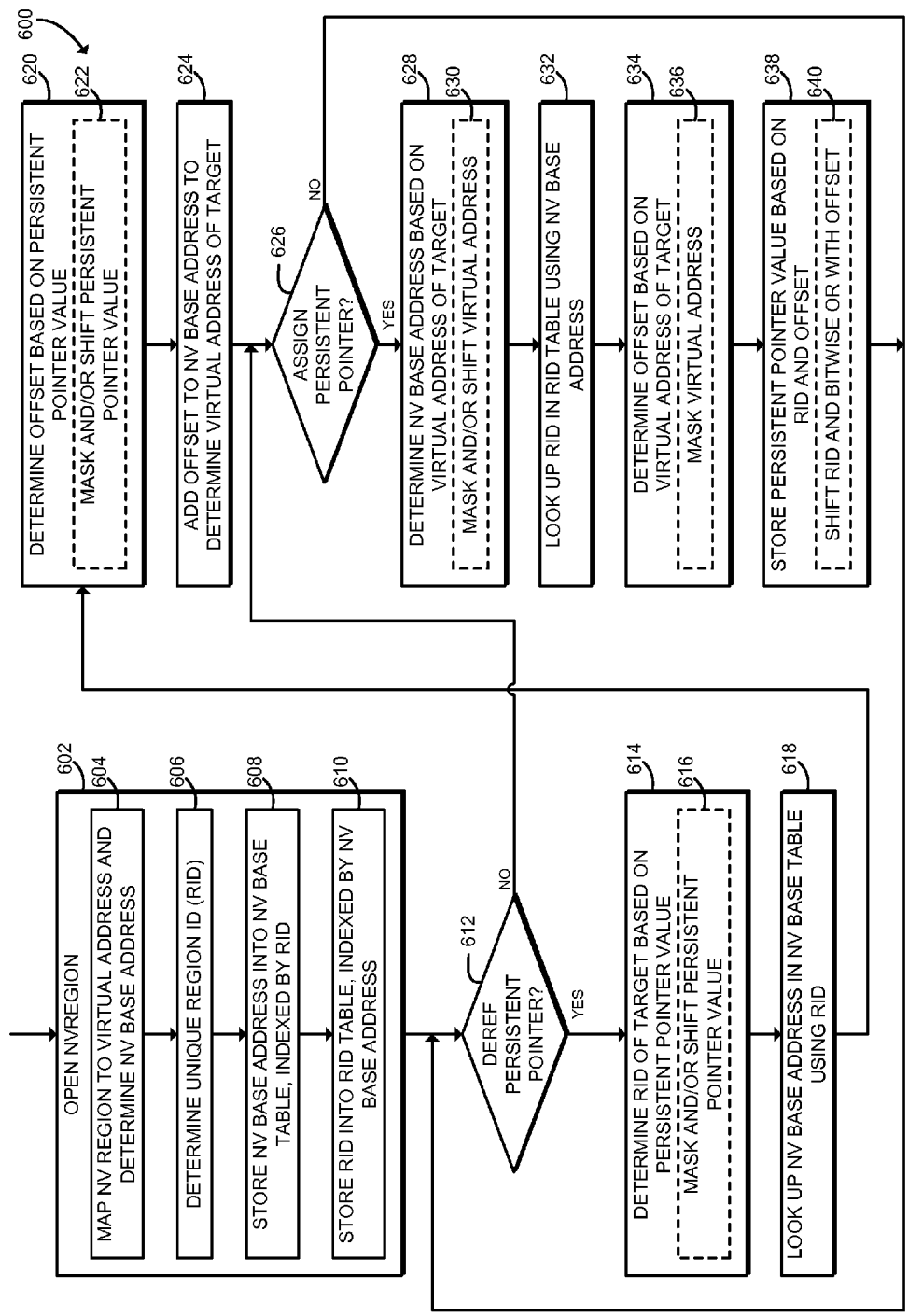
FIG. 6 is a simplified flow diagram of at least one embodiment of another method for persistent memory pointer access that may be executed by the computing device of FIGS. 1 and 3.

Referring now to FIG. 6, in use, the computing device 100 may execute a method 600 for persistent pointer access. The method 600, or parts of the method 600, may represent a persistent pointer strategy that may be executed by the computing device 100 when accessing data within an NVRegion, for example as described above in connection with block 410 of FIG. 4. In particular, the method 600 may represent a persistent pointer strategy known as the "ID-in-value" strategy, which is useable for both intra-region persistent pointers and inter-region persistent pointers. The method 600 begins in block 602, in which the computing device 100 opens an NVRegion. The operations of block 602 may be performed, for example, as part of the block 402 of FIG. 4, described above.

In block 604, the computing device 100 maps the opened NVRegion to a virtual address range within the virtual address space and determines the associated virtual base address. As shown in FIG. 3, the virtual base address may be embodied as a virtual address pointing to the beginning of a particular NVRegion. Given that the persistent memory 128 is mapped to the upper $L_1$ bits of the virtual address space, and that each NVRegion may occupy at most $L_3$ bits of the virtual address space, the middle $L_2$ bits of the virtual base address, where $L_2$ equals the size of the virtual address space (e.g., 64 bits) minus $L_1$ and $L_3$, may identify each NVRegion. The middle $L_2$ bits of the virtual address space may be referred to as the NVBase of each NVRegion.

In block 606, the computing device 100 determines a unique region ID (RID) for the NVRegion. The RID may be embodied as an integer number no larger than $L_4$ bits in length, where $L_4$ is less than $L_3$. The computing device 100 may use any technique for assigning unique RIDs to new NVRegions. The RID may be stored in the NVRegion so that the RID is available when loading a previously-created NVRegion.

Figure 7:
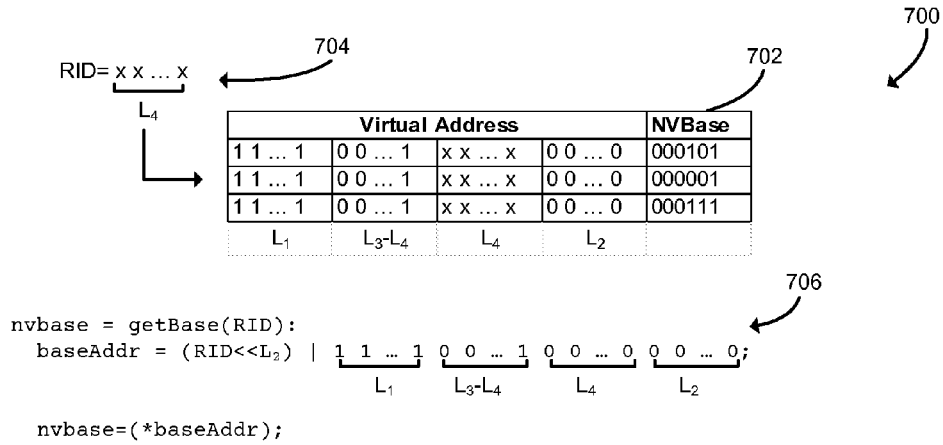
FIG. 7 is a schematic diagram of a nonvolatile base address table and indexing algorithm that may be used by the method of FIG. 6.

In block 608, the computing device 100 stores the virtual base address into an NV base table, indexed as a function of the RID of the NVRegion. Referring now to FIG. 7, the diagram 700 illustrates one embodiment of an NV base table 702 and associated indexing function. As shown, the RID 704 may be embodied as an integer number having $L_4$ bits. To index the NV base table 702, the RID 704 is transformed by the function 706 into a virtual memory address within the NV base table 702. In particular, the virtual address within the NV base table 702 includes the $L_1$ most significant bits each set to '1', the $L_3$–$L_4$ next-most significant bits set to a binary representation of the integer 1, the next-most significant $L_4$ bits set to the RID, and the $L_2$ least-significant bits each set to '0.' As illustrated by the function 706, the virtual address within the NV base table 702 may be calculated by left-shifting the RID by $L_2$ bits and bitwise OR'ing that value with an integer constant with the $L_1$ most-significant bits set to '1,' the $L_3$–$L_4$ next-most-significant bits set to a binary representation of the integer 1, the $L_4$ next-most significant bits set to '0,' and the $L_2$ least-significant bits set to '0.' In some embodiments, table space may be saved by left-shifting a smaller amount, such as by $\log_2(L_2)$ bits. Thus, the NV base table 702 may be embodied as a non-contiguous collection of virtual address locations within the persistent memory 128, indexed as a function of the RID. As shown in FIG. 7, the indexing function may include only shift and bitwise comparison operations and thus may be performed quickly.

Figure 8:
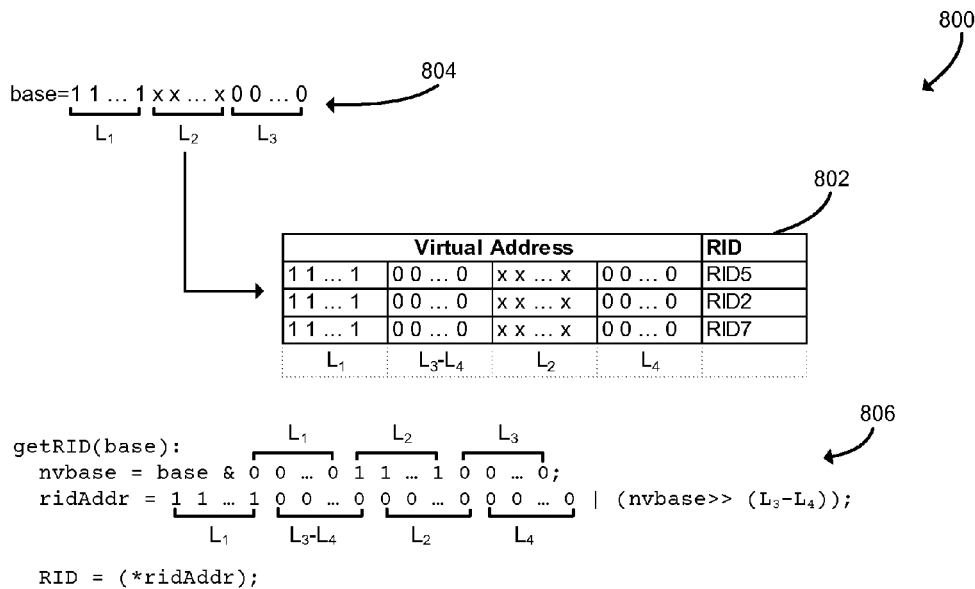
FIG. 8 is a schematic diagram of a nonvolatile region ID table and indexing algorithm that may be used by the method of FIG. 6.

Referring back to FIG. 6, in block 610, the computing device 100 stores the RID of the NVRegion into an RID table, indexed as a function of the virtual base address of the NVRegion. Referring now to FIG. 8, the diagram 800 illustrates one embodiment of an RID table 802 and associated indexing function. As shown, the virtual base address 804 may be embodied as a virtual address with $L_1$ most-significant bits set to '1,' $L_3$ least-significant bits set to '0,' and $L_2$ remaining bits in the middle (also known as the NV base of the virtual base address). To index the RID table 802, the virtual base address 804 is transformed by the function 806 into a virtual memory address within the RID table 802. In particular, the virtual address within the RID table 802 includes the $L_1$ most significant bits each set to '1,' the $L_3$–$L_4$ next-most-significant bits each set to '0,' the next-most-significant $L_2$ bits set to the NV base of the virtual base address, and the least-significant $L_4$ bits each set to '0.' As illustrated by the function 806, the NV base of the virtual base address may be calculated by masking out the most-significant $L_1$ bits and the least-significant $L_3$ bits of the virtual base address, leaving the $L_2$ middle bits. In some embodiments, $L_2$ must be no smaller than $L_3$–$L_4$–2, otherwise the base address may conflict with the NV base table 702 and the RID table 802. The virtual address within the RID table 802 may be calculated by right-shifting the NV base value by $L_3$–$L_4$ bits, and then bitwise OR'ing that value with an integer constant with the $L_1$ most-significant bits set to '1' and the rest of the bits set to '0.' In some embodiments, table space may be saved by right-shifting a smaller amount, such as by $\log_2(L_4)$ bits. Thus, the RID table 802 may be embodied as a non-contiguous collection of virtual address locations within the persistent memory 128, indexed as a function of the virtual base address. As shown in FIG. 8, and similar to the NV base table 702, the indexing function may include only shift and bitwise comparison operations and thus may be performed quickly.

Referring back to FIG. 6, after opening the NVRegion in block 602, in block 612 the computing device 100 determines whether to dereference a persistent pointer. The computing device 100 may dereference a persistent pointer in response to high-level language programming constructs, API or system calls, low-level instructions generated by a compiler or assembler, or any other request to dereference a persistent pointer. If the computing device 100 determines not to dereference a pointer, the method 600 branches ahead to block 626, described below. If the computing device 100 determines to dereference a pointer, the method 600 advances to block 614.

In block 614, the computing device 100 determines, based on the persistent pointer value, the RID of the NVRegion that contains the target of the persistent pointer. The RID may be packed within the persistent pointer value using any appropriate technique. For example, the persistent pointer may include $L_4$ bits representing the RID of the target memory location. In some embodiments, a NULL persistent pointer may be associated with a reserved RID, such as zero. In some embodiments, in block 616 the computing device 100 may determine the RID by masking and/or shifting the value of the persistent memory pointer. For example, the RID may be stored as $L_4$ bits of the persistent memory pointer adjacent to the $L_3$ least-significant bits of the persistent pointer. In that embodiment, the value of persistent memory pointer may be right-shifted by $L_3$ bits, or another value appropriate to place the RID in the least-significant $L_4$ bits.

In block 618, the computing device 100 looks up the virtual base address of the NVRegion containing the target based on the RID. The computing device 100 calculates a virtual address within the NV base table as a function of the RID and reads the virtual base address value stored at that location. In some embodiments, the NV base table may include zero for the reserved RID associated with a NULL pointer. For example, referring to FIG. 7, the computing device 100 may apply the function 706 to determine the address within the NV base table 702.

In block 620, the computing device 100 determines an offset value based on the value of the persistent pointer. The offset value may be packed within the persistent pointer using any appropriate technique. For example, the persistent pointer may include $L_3$ bits representing the position of the target within its respective NVRegion. In some embodiments, in block 622 the computing device 100 may determine the offset by masking and/or shifting the value of the persistent pointer. For example, the offset may be stored as the $L_3$ least-significant bits of the persistent memory pointer. In that embodiment, the most-significant $L_1$+$L_2$ bits may be masked off to determine the offset.

In block 624, the computing device 100 adds the offset to the virtual base address to determine the virtual address of the target. The virtual address of the target may be used by the computing device 100 to perform further memory accesses of the target.

Referring back to block 612, if the computing device 100 determines not to dereference a persistent pointer, the method 600 branches ahead to block 626, in which the computing device 100 determines whether to assign a virtual memory address to a persistent pointer. The computing device 100 may assign a persistent pointer in response to high-level language programming constructs, API or system calls, low-level instructions generated by a compiler or assembler, or any other request to assign a persistent pointer. If the computing device 100 determines not to assign a pointer, the method 600 loops back to block 612 to perform additional persistent memory operations. If the computing device 100 determines to assign a pointer, the method 600 advances to block 628.

In block 628, the computing device 100 determines the virtual base address of the NVRegion that includes the virtual memory address of the target. As described above in, the virtual base address may point to the beginning of the NVRegion. In some embodiments, in block 630 the computing device 100 may mask and/or shift the virtual memory address to determine the virtual base address. For example, the computing device 100 may mask off the least-significant $L_3$ bits of the virtual memory address to determine the virtual base address.

In block 632, the computing device 100 looks up the RID of the NVRegion using the virtual base address. The computing device 100 calculates a virtual memory address within the RID table as a function of the virtual base address and reads the RID value stored at that location. For example, referring to FIG. 8, the computing device 100 may apply the function 806 to determine the virtual address within the RID table 802.

In block 634, the computing device 100 determines an offset value based on the virtual memory address of the target. The offset value represents the position of the target within its respective RID. In some embodiments, in block 636 the computing device 100 may determine the offset by masking a part of the virtual memory address. For example, the computing device 100 may mask the virtual memory address to retain only the least-significant $L_3$ bits.

In block 638, the computing device 100 calculates and stores the value of the persistent pointer based on the RID and the offset value. The computing device 100 may use any appropriate technique to pack the RID and the offset value within the persistent pointer value. In some embodiments, in block 640 the computing device 100 may determine the persistent pointer value by shifting the RID and bitwise OR'ing the shifted RID with the offset value. For example, in some embodiments, the computing device 100 may left shift the RID by $L_3$ bits and then bitwise OR that value with the offset value. The computing device 100 stores the calculated persistent pointer value into the persistent pointer. After assigning the persistent pointer, the method 600 loops back to block 612 to continue performing persistent memory operations.

Figure 9A:
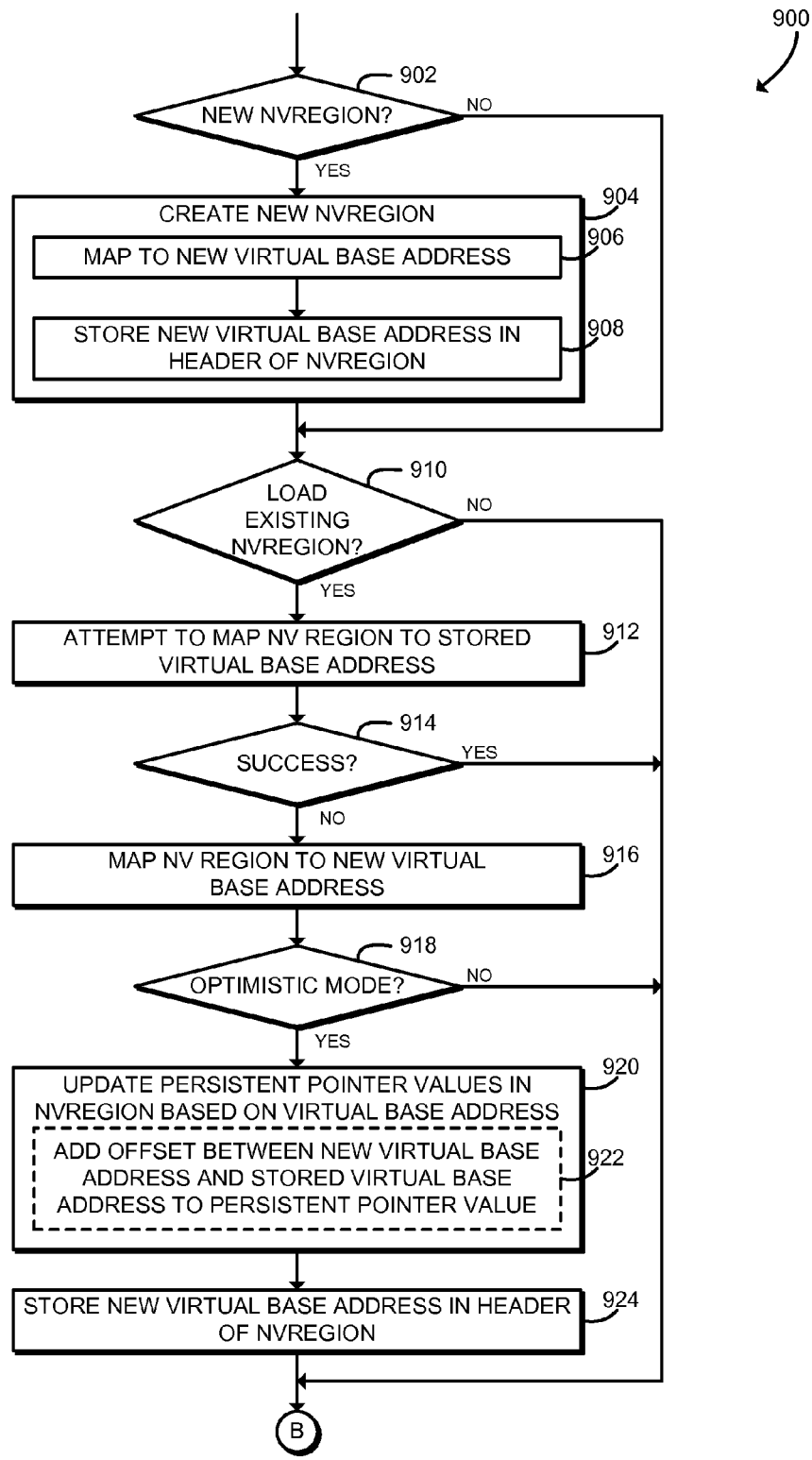
FIGS. 9A and 9B are a simplified flow diagram of at least one embodiment of another method for persistent memory pointer access that may be executed by the computing device of FIGS. 1 and 3.

Referring now to FIG. 9A, in use, the computing device 100 may execute a method 900 for persistent pointer access. The method 900, or parts of the method 900, may represent a persistent pointer strategy that may be executed by the computing device 100 when accessing data within an NVRegion, for example as described above in connection with block 410 of FIG. 4. In particular, the method 900 may represent two persistent pointer strategies known as optimistic and pessimistic pointer rectification, which both may be useable only for intra-region persistent pointers. The method 900 begins in block 902, in which the computing device 100 determines whether a new NVRegion should be created. The operation of block 902 may be performed in response to an API call, system call, or other request to create a new NVRegion. For example, a new NVRegion may be created as described above in connection with block 406 of FIG. 4. If a new NVRegion should not be created, the method 900 branches ahead to block 910, described below. If a new NVRegion should be created, the method 900 advances to block 904.

In block 904, the computing device 100 creates a new NVRegion. The computing device 100 may perform any initialization operations or other routines, as described above in connection with block 406 of FIG. 4. Additionally, in block 906, the computing device 100 maps the new NVRegion to a new virtual base address. As described above, the new virtual base address may be automatically allocated or specified by the requesting process. In block 908, the computing device 100 stores the new virtual base address of the NVRegion into the header of the new NVRegion. Thus, because the NVRegion is itself within the persistent memory 128, the new virtual base address will remain available after any power cycles of the computing device 100.

Referring back to block 902, if a new NVRegion is not created, then the method 900 branches ahead to block 910, in which the computing device 100 determines whether to load an existing NVRegion. If the computing device 100 determines not to load an existing NVRegion, for example because a new NVRegion was created in block 904, the method 900 branches ahead to block 926, shown in FIG. 9B. If an existing NVRegion is to be loaded, the method 900 advances to block 912.

In block 912, the computing device 100 attempts to map the existing NVRegion to the virtual base address stored in the header of the NVRegion. The computing device 100 may additionally perform any initialization or other operation performed when loading an existing NVRegion, for example as described above in connection with block 408 of FIG. 4. In block 914, the computing device 100 determines whether the NVRegion was successfully mapped to the stored virtual base address. Mapping the NVRegion may fail, for example, if the stored virtual base address is already occupied by another NVRegion, program data, or otherwise unavailable. If the NVRegion was successfully mapped, the method 900 branches ahead to block 926, shown in FIG. 9B. If the NVRegion was not successfully mapped, then the method 900 advances to block 916.

In block 916, the computing device 100 maps the existing NVRegion to a new virtual base address. As described above, the new virtual base address may be automatically allocated or specified by the requesting process. In block 918, the computing device 100 determines whether pointer rectification should be performed in optimistic mode. The pointer rectification mode may be specified by a programmer at compile time, by a user or administrator at runtime, or determined automatically, for example using an appropriate a heuristic algorithm. The appropriate rectification mode may depend on the frequency that an NVRegion is mapped to a different virtual base address and the frequency that persistent pointers are accessed within the NVRegion. For example, if the NVRegion is rarely mapped to the same virtual base address and the average number of dynamic accesses to each persistent pointer within the NVRegion is typically less than one, the pessimistic mode may be preferred (that is, the optimistic mode may not be preferred). Continuing that example, in all other circumstances the optimistic mode may be preferred. Additionally or alternatively, optimistic pointer rectification may not be appropriate for access to memory shared by multiple processes. One of the processes may perform optimistic rectification, and the other processes may perform pessimistic rectification. If the optimistic mode should not performed (that is, if the pessimistic mode is to be performed), the method 900 branches ahead to block 926, shown in FIG. 9B. If the optimistic mode should be performed, the method 900 advances to block 920.

In block 920, the computing device 100 updates each intra-region persistent pointer value in the NVRegion based on the current virtual base address of the NVRegion. In particular, the computing device 100 may perform any adjustment necessary to change each persistent pointer value to include the current virtual memory address of the target.

In some embodiments, in block 922, the computing device 100 may add the persistent pointer value to an offset between the current virtual base address of the NVRegion and the stored virtual base address of the NVRegion. In other words, the computing device 100 may calculate the difference between the stored position of the NVRegion and the currently mapped position of the NVRegion and adjust each intra-region persistent pointer accordingly. In block 924, the computing device 100 stores the new virtual base address of the NVRegion into the header of the NVRegion, for future use.

Figure 9B:
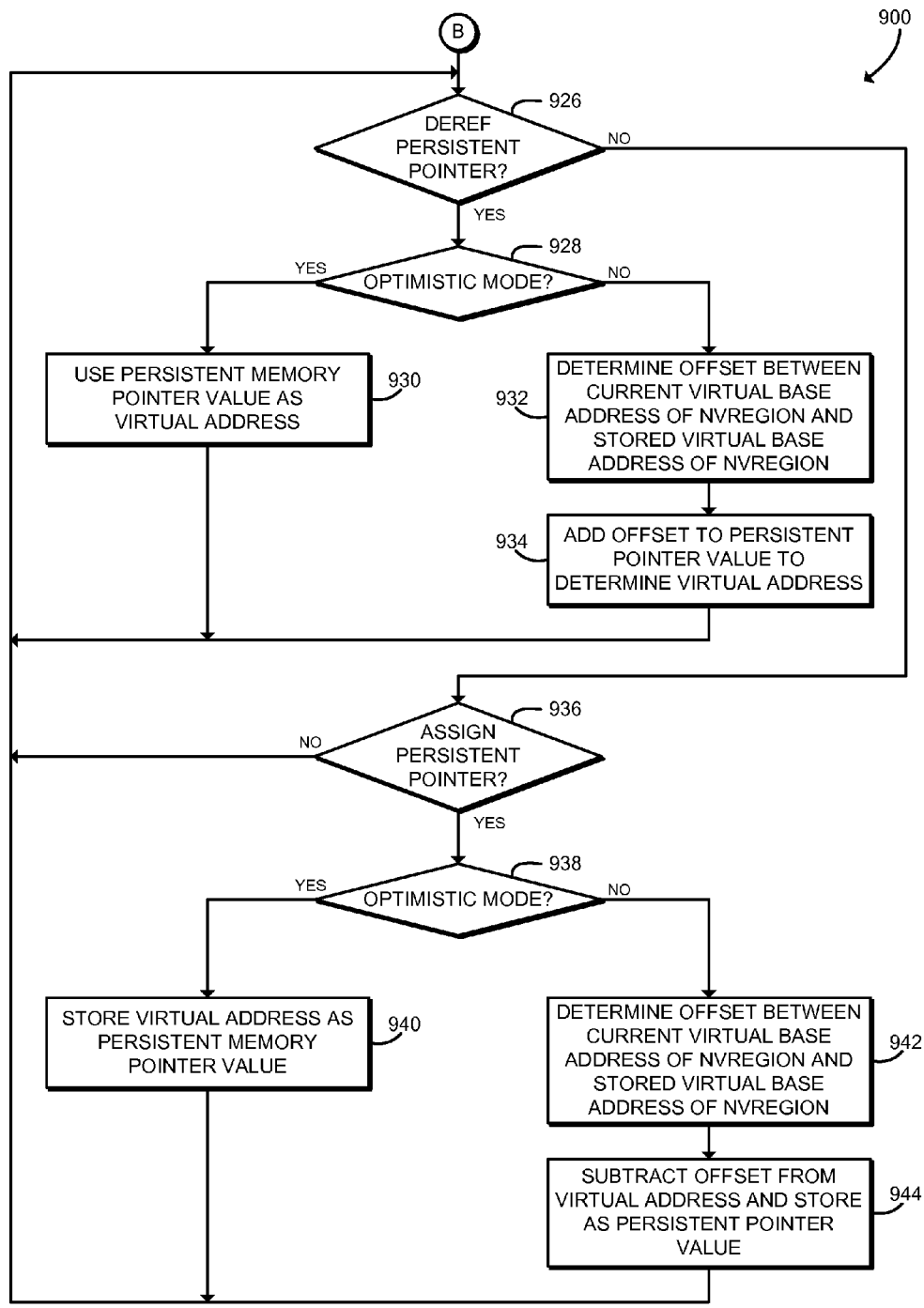

Referring now to FIG. 9B, the method 900 continues to perform persistent memory operations starting with block 926. As described above, block 926 may be reached after creating a new NVRegion in block 904, after mapping an existing NVRegion to its stored virtual base address in block 912, or after mapping an existing NVRegion to a new virtual base address in either optimistic or pessimistic mode. In block 926, the computing device 100 determines whether to dereference a persistent pointer. The computing device 100 may dereference a persistent pointer in response to high-level language programming constructs, API or system calls, low-level instructions generated by a compiler or assembler, or any other request to dereference a persistent pointer. If the computing device 100 determines not to dereference a pointer, the method 900 branches ahead to block 936, described below. If the computing device 100 determines to dereference a pointer, the method 900 advances to block 928.

In block 928, the computing device 100 determines whether to dereference the persistent pointer in optimistic mode. The mode for dereferencing the persistent pointer must be the same mode in which the NVRegion was loaded, as described above. If dereferencing in optimistic mode, the method 900 branches to block 930, in which the computing device 100 uses the persistent pointer value as the virtual memory address of the target without modification. After using the persistent pointer value, the method 900 loops back to block 926 to perform additional persistent memory operations.

Referring back to block 928, if not dereferencing in optimistic mode (i.e., in pessimistic mode), the method 900 branches to block 932. In block 932, the computing device 100 determines the offset between the current virtual base address of the NVRegion and the stored virtual base address of the NVRegion. In other words, the computing device 100 determines the difference between the current location of the NVRegion and the stored location of the NVRegion. In block 934, the computing device 100 adds the offset to the value of the persistent pointer to determine the virtual memory address of the target. In circumstances when the offset is zero, that is, for example when the NVRegion has been successfully mapped to the stored virtual base address, the addition of the offset may be eliminated, omitted, elided, or otherwise skipped, for example by a just-in-time compiler of the computing device 100. After determining the virtual memory address of the target, the method 900 loops back to block 926 to continue performing persistent memory operations.

Referring back to block 926, if the computing device determines not to dereference a persistent pointer, the method 900 branches ahead to block 936, in which the computing device 100 determines whether to assign a virtual memory address to a persistent pointer. The computing device 100 may assign a persistent pointer in response to high-level language programming constructs, API or system calls, low-level instructions generated by a compiler or assembler, or any other request to assign a persistent pointer. If the computing device 100 determines not to assign a pointer, the method 900 loops back to block 926 to continue performing persistent memory operations. If the computing device 100 determines to assign a pointer, the method 900 advances to block 938.

In block 938, the computing device 100 determines whether to assign the persistent pointer in optimistic mode. The mode for assigning the persistent pointer must be the same mode in which the NVRegion was loaded, as described above. If assigning in optimistic mode, the method 900 branches to block 940, in which the computing device 100 stores the virtual memory address of the target in the persistent pointer without modification. After storing the persistent pointer value, the method 900 loops back to block 926 to perform additional persistent memory operations.

Referring back to block 938, if not assigning in optimistic mode (i.e., in pessimistic mode), the method 900 branches to block 942. In block 942, the computing device 100 determines the offset between the current virtual base address of the NVRegion and the stored virtual base address of the NVRegion. In other words, the computing device 100 determines the difference between the current location of the NVRegion and the stored location of the NVRegion. In block 944, the computing device 100 subtracts the offset from the virtual memory address of the target and stores the result as the value of the persistent pointer. In circumstances when the offset is zero, that is, for example when the NVRegion has been successfully mapped to the stored virtual base address, the subtraction of the offset may be eliminated, omitted, elided, or otherwise skipped, for example by a just-in-time compiler of the computing device 100. After storing the persistent pointer, the method 900 loops back to block 926 to continue performing persistent memory operations.

Figure 10:
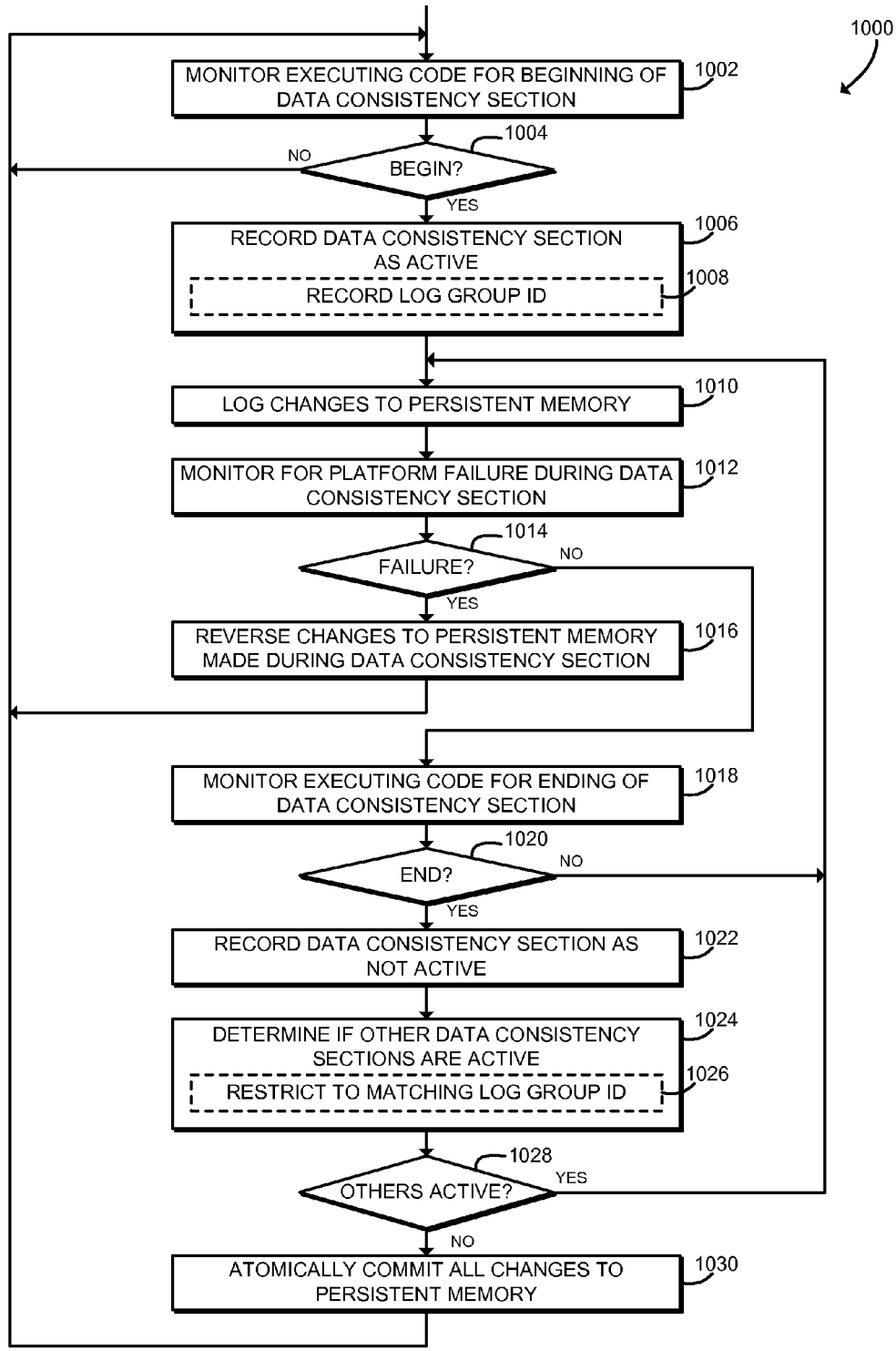
FIG. 10 is a simplified flow diagram of at least one embodiment of a method for persistent memory data consistency that may be executed by the computing device of FIGS. 1 and 3.

Referring now to FIG. 10, in use, the computing device 100 may execute a method 1000 for persistent data durability. The method 1000 begins in block 1002, in which the computing device 100 monitors executing code for the beginning of a data consistency section. The beginning of a data consistency section may be found in response to high-level language programming keywords, blocks, or other constructs, application programming interface (API) or system calls, low-level instructions generated by a compiler or assembler, or any other techniques for signaling the beginning of a data consistency section. The beginning of the data consistency section may be marked by a programmer using compiler or language support as described below in connection with FIG. 11. In block 1004, the computing device 100 determines whether the beginning of a data consistency section has been found. If not, the method 1000 loops back to block 1002 to continue monitoring for data consistency sections. If a data consistency section has been found, the method 1000 advances to block 1006.

In block 1006, the computing device 100 records the current data consistency section as active. The computing device 100 may use any technique to record the identity and status of each data consistency section. For example, the computing device 100 may maintain a stack, list, or other data structure recording active data consistency sections. The data consistency section records may be accessible by any processes, threads, or other programs executed by the computing device 100. In block 1008, the computing device 100 may record a log group ID associated with the new data consistency section. As further described below, groups of related threads may use the same log group ID to maintain data consistency for concurrent access to the persistent memory 128. For example, the log group ID may be maintained as an inter-process shared variable used by a related group of processes. In some embodiments, when no log group ID is supplied, the data consistency section may be assigned to a log group independent of all other data consistency sections. The log group ID may be supplied using compiler or language support as described below in connection with FIG. 11.

After recording the data consistency section as active, in block 1010 the computing device 100 logs all changes to the persistent memory 128 created during execution of the data consistency section. The computing device 100 may log the changes to persistent memory 128 using any data logging technique, including an undo log or a redo log. The data log itself may also be stored in the persistent memory 128.

In block 1012, the computing device 100 monitors for a platform failure during execution of the data consistency section. The platform failure may include any failure, exception, or other error condition that may leave the persistent memory 128 in an inconsistent state. For example, the platform failure may include a power failure or a software crash. In block 1014, the computing device 100 determines whether a platform failure has occurred. If not, the method 1000 advances to block 1018, described below. If a platform failure is detected, the method 1000 advances to block 1016.

In block 1016, the computing device 100 reverses changes to the persistent memory 128 that were made during execution of the data consistency section. The computing device 100 may use any technique to reverse the changes. For example, the computing device 100 may restore previous values that were saved in an undo log, or discard the new values stored in a redo log. The computing device 100 may reverse the changes to the persistent memory 128 when recovering from the platform failure, for example upon reboot after a power failure. After reversing the changes to the persistent memory 128, the method 1000 loops back to block 1002 to continue monitoring for data consistency sections. In some embodiments, the computing device 100 may retry the data consistency section that was executing during the platform failure.

Referring back to block 1014, if a platform failure is not detected, the method 1000 branches ahead to block 1018. In block 1018, the computing device 100 monitors executing code for the ending of a data consistency section. Similar to the beginning of data consistency sections, the ending of a data consistency section may be found in response to high-level language programming keywords, blocks, or other constructs, application programming interface (API) or system calls, low-level instructions generated by a compiler or assembler, or any other techniques for signaling the ending of a data consistency section. The ending of the data consistency section may be marked by a programmer using compiler or language support as described below in connection with FIG. 11. In block 1020 the computing device determines whether an ending of a data consistency section has been found. If not, the method 1000 loops back to block 1010 to continue executing the data consistency section and logging changes to the persistent memory 128. If an ending of a data consistency section is found, the method 1000 advances to block 1022.

In block 1022, the computing device 100 records the corresponding data consistency section as not active. The computing device 100 may use any appropriate technique for marking the data consistency section as not active, including popping a record from a stack or setting a value to indicate the data consistency section is not active. In block 1024, the computing device 100 determines whether other data consistency sections are active on the computing device 100. The computing device 100 may determine whether any data consistency sections are active in other processes or threads executed contemporaneously by the computing device 100. In block 1026, in some embodiments, the computing device 100 may restrict its search to active data consistency sections having a matching log group ID. In other words, the computing device 100 may determine whether other, related data consistency sections remain active from the same log group.

In block 1028, the computing device 100 determines whether other data consistency sections are active. If so, the method 1000 loops back to block 1010 and continues executing the active data consistency sections and logging changes to the persistent memory 128. If no data consistency sections remain active, the method 1000 advances to block 1030.

In block 1030, the computing device 100 atomically commits all changes to the persistent memory 128 that were logged during execution of the data consistency section(s). Thus, by waiting until no more related data consistency sections are active, the computing device 100 may implement an outermost logcommit section policy. After committing the changes to persistent memory 128, the persistent memory 128 may be in a consistent state that is durable across power cycles or platform failures. The computing device 100 may use any technique for atomically committing the changes to the persistent memory 128. For example, the computing device 100 may discard all previous values stored in an undo log or atomically store to the persistent memory 128 all values stored in a redo log. After atomically committing the changes to the persistent memory 128, the method 1000 loops back to block 1002 to continue monitoring for new data consistency sections.

Figure 11:
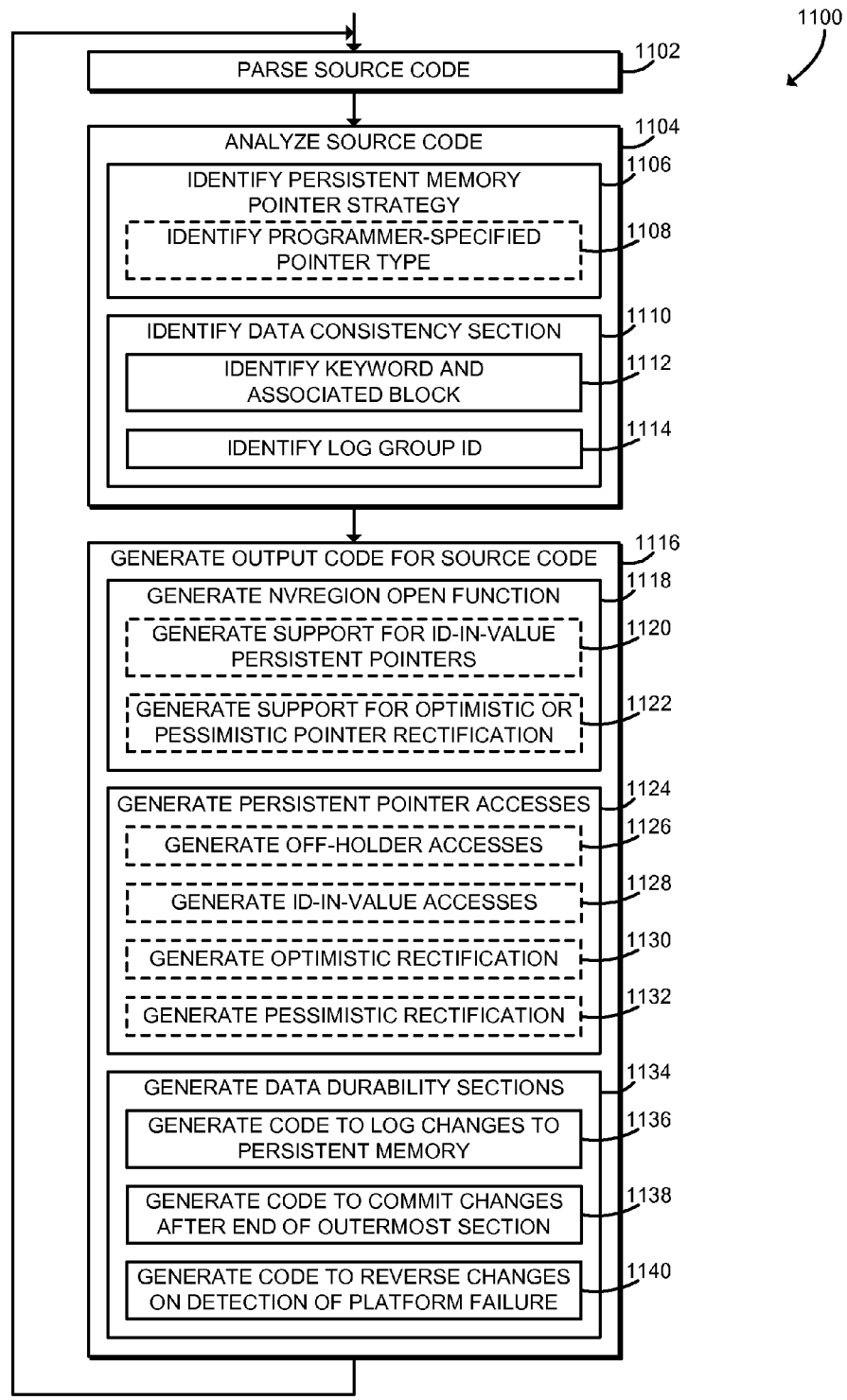
FIG. 11 is a simplified flow diagram of at least one embodiment of a method for compiling source code with persistent memory programming support that may be executed by the computing device of FIGS. 1 and 3.

Referring now to FIG. 11, in use, the computing device 100 may execute a method 1100 for compiling source code 302 that includes persistent memory programming support. The method 1100 begins in block 1102, in which the computing device 100 parses the source code 302. The parse stage of block 1102 may generate an in-memory representation of the source code 302 that may be analyzed and modified by later stages of the compiler 304. For example, the compiler 304 may generate an abstract syntax tree ("AST") or an intermediate representation of the source code 302. The intermediate representation may be embodied as a graph structure connecting basic blocks of instructions targeting an abstract computing device.

In block 1104, the computing device 100 analyzes the source code 302. The computing device 100 may identify various control structures, data types, or other programming constructs specified by the programmer and included in the intermediate representation. In some embodiments, in block 1106 the computing device 100 may identify a persistent memory pointer strategy specified by the source code 302. The persistent memory pointer strategy may be implicitly specified in the source code 302. For example, a particular strategy may be implicitly specified for intra-region persistent memory pointers and a different strategy may be implicitly specified for inter-region persistent memory pointers. In some embodiments, in block 1108 the computing device 100 may identify a programmer-specified pointer type. The type of the persistent memory pointer may be used to determine the specified pointer strategy. The computing device 100 may identify several distinct pointer strategies, and a different pointer strategy may be identified for each pointer access.

In block 1110, the computing device 100 may identify a data consistency section in the source code 302. The computing device 100 may identify any programming construct, annotation, or other command included by the programmer to delimit the data consistency section. For example, in block 1112 the computing device 100 may identify a keyword and associated block of the source code 302 corresponding to a data consistency section. In block 1114, the computing device 100 may identify a log group ID associated with the data consistency section. The log group ID may be identified as a variable, constant, or other value supplied by the programmer when delimiting the data consistency section.

In block 1116, the computing device 100 generates output code based on the in-memory representation of the source code 302. In some embodiments, the generated output code may be embodied as a list of instructions for the particular target computing device. The output code may be executable code 322, object code that may be linked to produce the executable code 322, or intermediate code that may be further processed by the compiler 304.

In block 1118, the computing device 100 may generate an NVRegion open function that is executed by the executable code 322 whenever an NVRegion is opened. The NVRegion open function may execute any initialization code required to load, map, or otherwise prepare an NVRegion for use by an executing process. In some embodiments, the computing device 100 may generate a reference to an NVRegion open function that is implemented or embodied by external code such as a shared library. Additionally or alternatively, in some embodiments the NVRegion open function may include initialization code required by various persistent memory pointer strategies used by the executable code 322. For example, in block 1120, in some embodiments the computing device 100 may generate support for the ID-in-value persistent memory pointer strategy. In particular, the computing device 100 may generate code to reserve and populate the NV base table and the RID table in the persistent memory 128. Additionally or alternatively, in block 1122 in some embodiments the computing device 100 may generate code to perform optimistic and/or pessimistic pointer rectification in the NVRegion open function.

In block 1124, the computing device 100 may generate code for persistent memory pointer accesses. As described above, a persistent memory pointer access may include an operation to dereference a persistent memory pointer value and generate a corresponding virtual memory address and/or an operation to assign a virtual memory address to a corresponding persistent memory pointer value. The particular code generated for each persistent memory pointer access depends on the corresponding pointer strategy for that pointer access, as described above in connection with FIGS. 5-9. In block 1126, in some embodiments the computing device 100 may generate code for the off-holder persistent pointer strategy. In block 1128, in some embodiments the computing device 100 may generate code for the ID-in-value persistent pointer strategy. In block 1130, in some embodiments the computing device 100 may generate code for the optimistic rectification persistent pointer strategy. In block 1132, in some embodiments the computing device 100 may generate code for the pessimistic rectification persistent pointer strategy.

In block 1134, the computing device 100 may generate code for data consistency sections in the source code 302. Again, in some embodiments the computing device 100 may generate a reference to functionality provided by external code such as a shared library. The generated code may perform functions as described above in connection with FIG. 10. In block 1136, the computing device 100 may generate code to log changes the persistent memory 128 during execution of the data consistency section. In block 1138, the computing device 100 may generate code to commit changes to the persistent memory 128 after the end of the outermost data consistency section (an outermost logcommit section policy). In block 1140, the computing device 100 may generate code to reverse changes to the persistent memory 128 on detection of a platform failure. After generating the object code, the method 1100 loops back to block 1102 to continue parsing the source code 302. Additionally, as described above, the illustrative compiler 304 performs the parse, analysis, and code generation stages sequentially. In other embodiments, any number of stages may be included, and each stage may make multiple passes through the source code 302. For example, in some embodiments, the compiler 304 may parse the source code 302 into an intermediate representation and repeatedly analyze the intermediate representation. Further, although illustrated as executing sequentially, in other embodiments, the compiler stages may be performed simultaneously or in parallel.

Referring now to FIG. 12, pseudocode 1200 illustrates example source code 302 that may be compiled by the compiler 304 during execution of the method 1100. The pseudocode 1200 illustrates several compiler and/or language features that may be used to provide persistent memory programming support. In particular, the pseudocode 1200 illustrates manipulation of a balanced tree stored within the persistent memory 128 using position-independent persistent memory pointers, data consistency sections, and other persistent memory programming features.

The pseudocode 1200 begins with several type definitions, in particular definitions for the Tree, Node, and Array types. The Tree and Node types both include several intra-region persistent memory pointers 1202. In the illustrative example, the intra-region persistent memory pointers 1202 are defined using the keyword "persistentI." The compiler 304 may select an appropriate pointer strategy for the pointers 1202 such as the off-holder strategy, the ID-in-value strategy, the optimistic rectification strategy, or the pessimistic rectification strategy. Similarly, the Array type includes a definition for an inter-region persistent memory pointer 1204. In the illustrative example, the inter-region persistent memory pointer 1204 is defined using the keyword "persistentX." The compiler 304 may select an appropriate pointer strategy for the pointer 1204 such as the ID-in-value strategy. The particular pointer strategy or strategies selected may be defined at compile time by, for example, compiler flags, header files, or other techniques.

The pseudocode 1200 continues with a function f( ) that manipulates persistent memory values. The function f( ) declares several volatile memory pointers 1206 that are stored in the volatile memory 126 and may point to locations within the persistent memory 128. Those volatile memory pointers 1206 are declared using the keyword "persistent." The compiler 304 may use implicit type conversion, type casting, or any other appropriate technique to convert between the virtual memory values stored in the volatile memory pointers 1206 and the values of the persistent memory pointers 1202, 1204.

Next, in the statements 1208, the pseudocode 1200 opens two NVRegions, identified as "./treeRegion" and "./arrayRegion." The virtual base addresses of those NVRegions are stored in the volatile memory pointers region1 and region2, respectively.

After opening the NVRegions, the pseudocode 1200 determines whether an NVRoot identified as "tree1" exists within region1. If not, the pseudocode 1200 opens a data consistency section 1210. As illustrated, the data consistency section is delimited using the keyword "NVLogCommit" and associated braces that contain the code statements of the data consistency section. In the illustrative example, the data consistency section 1210 does not specify a log group ID. Thus, the compiler 304 may assign the data consistency section 1210 a unique, private log group ID or otherwise ensure that the data consistency section 1210 is independent of all other data consistency sections. Within the data consistency section 1210, in statement 1212 the pseudocode 1200 creates a new NVRoot named "tree1" within region1, and in statement 1214 the pseudocode 1200 creates a new Node within region1. In statement 1216, the pseudocode 1200 adds the newly created node1 to the NVRoot tree1. As part of that operation, the pseudocode 1200 may generate persistent memory pointer assignments to one or more of the intra-region persistent memory pointers 1202 (e.g., persistentI Node* left or persistentI Node* right of the Tree and/or Node types). The data structure created within the persistent memory 128 may thus resemble the NVSet 226 illustrated in FIG. 2. Additionally, after completing the data consistency section 1210, the persistent memory 128 may be in a consistent, durable state.

Continuing the pseudocode 1200, the pseudocode 1200 determines whether an NVRoot identified as "array1" exists within region2. If not, the pseudocode 1200 opens another data consistency section 1218 delimited by the keyword "NVLogCommit." Within the data consistency section 1218, in statement 1220 the pseudocode 1200 creates a new NVRoot named "array1" within region2. In statement 1222, the pseudocode 1200 assigns a virtual memory value, node1, to an inter-region persistent memory pointer 1204 (i.e., persistentX Node* nodes[0] of the type Array). The data structure created within the persistent memory 128 may thus resemble the NVSet 228 illustrated in FIG. 2. After completing the data consistency section 1218, the persistent memory 128 may be in a consistent, durable state.

Next, the pseudocode 1200 opens a new data consistency section 1224. In the illustrative example, the pseudocode 1200 supplies a log group ID as a variable parameter to the NVLogCommit keyword. In the illustrative example, the log group ID is the result of the getpid( ) function; in other words, the log group ID is the process ID of the currently executing process. In that example, that log group ID may be shared by other concurrently executing data consistency sections, either within the same process (e.g., in separate threads or as nested blocks) or in other processes (e.g., after retrieving the process ID from a lock file). As described above, changes logged to the persistent memory 128 may not be committed until after the last data consistency section having a matching log group ID is committed. In the illustrative embodiment, the pseudocode 1200 balances the tree within the data consistency section 1224.

After completing the data consistency section 1224, the pseudocode 1200 closes the NVRegions region1 and region2 in the statements 1226. After being closed, those NVRegions may no longer be accessible to the current instance of the pseudocode 1200. However, the data created and/or modified during execution of the pseudocode 1200 remains stored in the persistent memory 128 and may be available to other processes or to future invocations of the pseudocode 1200.

Although the pseudocode 1200 illustrates data consistency sections 1210, 1218, 1224 delimited with the NVLogCommit keyword, it should be understood that the compiler 304 and the associated runtime may also support a transactional log commit section. In a transactional log commit section, transactional memory and log commit boundaries are combined. Thus, changes to the persistent memory 128 made during a transactional log commit section remain private to the transactional log commit section are not made persistent until completion of the transactional log commit section. Because changes to the persistent memory 128 are not visible to other transactions until after commitment, there may be no need to track active transactions or apply an outermost logcommit section policy for transactional log commit sections. However, transactional log commit sections may require persistent memory support for the computing device 100 that executes the associated executable code 322. In source code, a transactional log commit section may be delimited using a keyword such as "NVLogCommit_tx" and an associated source code block.

Figure 13:
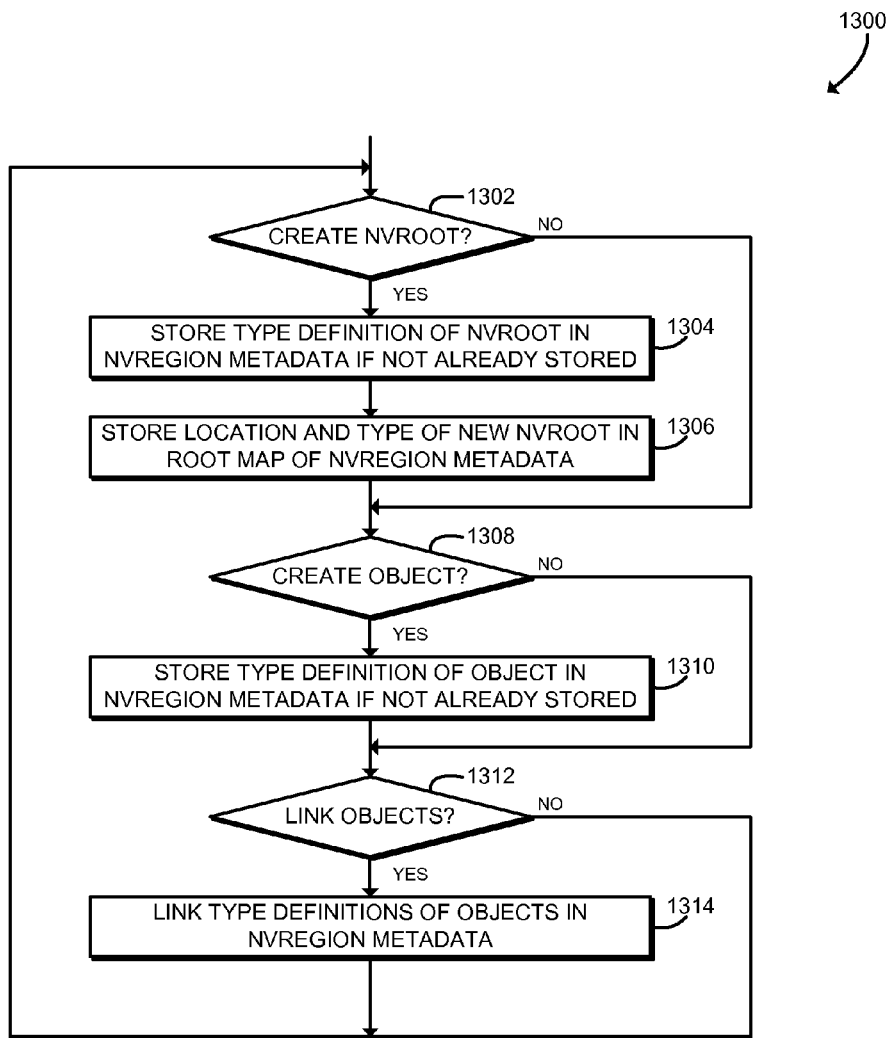
FIG. 13 is a simplified flow diagram of at least one embodiment of a method for generating type metadata in a persistent memory region that may be executed by the computing device of FIGS. 1 and 3.

Referring now to FIG. 13, in use the computing device 100 may execute a method 1300 for recording persistent data type definition data. The method 1300 may be executed, for example, while accessing data stored in a persistent memory NVRegion as described above in connection with block 410 of FIG. 4. The method 1300 begins in block 1302, in which the computing device 100 determines whether to create a new NVRoot within an NVRegion of the persistent memory 128. As described above in connection with FIG. 2, data stored within an NVRegion may be accessible through regular strides or pointer chasing starting from an NVRoot. The computing device 100 may create a new NVRoot in response to, for example, an application programming interface (API) call, system call, or other command generated by a running process. For example, the computing device 100 may create a new NVRoot in response to a call to the NVNewRoot function as described above in connection with FIG. 12. If the computing device 100 determines not to create a new NVRoot, the method 1300 branches ahead to block 1308, described below. If the computing device 100 determines to create a new NVRoot, the method 1300 advances to block 1304.

In block 1304, the computing device 100 stores the type definition of the new NVRoot in a type metadata region of the NVRegion. Each NVRoot may be embodied as a programming object that is stored within the persistent memory 128 and has a particular data type. The type of the NVRoot may define the size and layout of the NVRoot object in persistent memory. In particular, the type of the NVRoot object may define the location in memory and associated type of member variables of the NVRoot object. The type definition of the requested type may be determined at compile time (e.g., by including an appropriate header file), or at runtime (e.g., by reflection). The type definition may be stored or referenced in any appropriate data format. The computing device 100 may use any technique to determine the type of the NVRoot. For example, the requested type of the new NVRoot may be passed as a parameter to the API call used to create the new NVRoot. The computing device 100 may determine whether the requested type definition already exists in the type metadata region of the NVRegion; if so, the computing device 100 may not store a duplicate copy of the type definition.

In block 1306, after storing the type definition data, the computing device 100 stores the location and type of the new NVRoot in a root map of the NVRegion metadata. For example, the computing device 100 may store a persistent memory pointer, offset, or other value that may be used to identify the location of the NVRoot. The computing device 100 may store in the root map a type name or other identifier that may be used to retrieve the associated type definition data from the type metadata region. Thus, after updating the root map, the NVRoot and its associated type information may be located using information stored persistently within the metadata of the associated NVRegion itself.

In block 1308, the computing device 100 determines whether to create a new object within the NVRegion of the persistent memory 128, other than an NVRoot. For example, the computing device 100 may determine whether to create a new tree node, array element, or other object that may be referenced by an NVRoot or by another object reachable from an NVRoot. The computing device 100 may create a new object in response to, for example, an application programming interface (API) call, system call, or other command generated by a running process. For example, the computing device 100 may create a new object in response to a call to the NVNew function as described above in connection with FIG. 12. If the computing device 100 determines not to create a new object, the method 1300 branches ahead to block 1312, described below. If the computing device 100 determines to create a new object, the method 1300 advances to block 1310.

In block 1310, the computing device 100 stores the type definition of the new object in the type metadata region of the NVRegion. Each object stored in the NVRegion may be embodied as a programming object with a particular data type, similar to an NVRoot. The type definition may be stored or referenced in any appropriate data format in the type metadata region. Further, the computing device 100 may use any technique to determine the type of the new object. For example, the requested type of the new object may be passed as a parameter to the API call used to create the new object. The computing device 100 may determine whether the requested type definition already exists in the type metadata region of the NVRegion; if so, the computing device 100 may not store a duplicate copy of the type definition.

In block 1312, the computing device 100 determines whether to create a reference, pointer, or other link between objects stored in the persistent memory 128. The computing device 100 may determine whether to link objects in response to, for example, an application programming interface (API) call, system call, pointer manipulation, or other command generated by a running process. For example, the computing device 100 may link objects in response to a call to the AddChild method as described above in connection with FIG. 12. If the computing device 100 determines not to link objects, the method 1300 loops back to block 1302 to continue monitoring for the creation of new NVRoots. If the computing device 100 determines to link objects, the method 1300 advances to block 1314.

In block 1314, the computing device 100 links the type definitions within the type metadata region that are associated with the objects to be linked. For example, referring again to FIG. 12, following the AddChild method the computing device 100 may generate links between the type definition for the type Tree and the type definition for the type Node. As illustrated, the computing device 100 may generate two links labeled "left" and "right," based on the associated type definitions. The computing device 100 may record the link between type definitions in the type metadata region using any appropriate format. After linking the objects, the method 1300 loops back to block 1302 to continue monitoring for new NVRoots.

Figure 14:
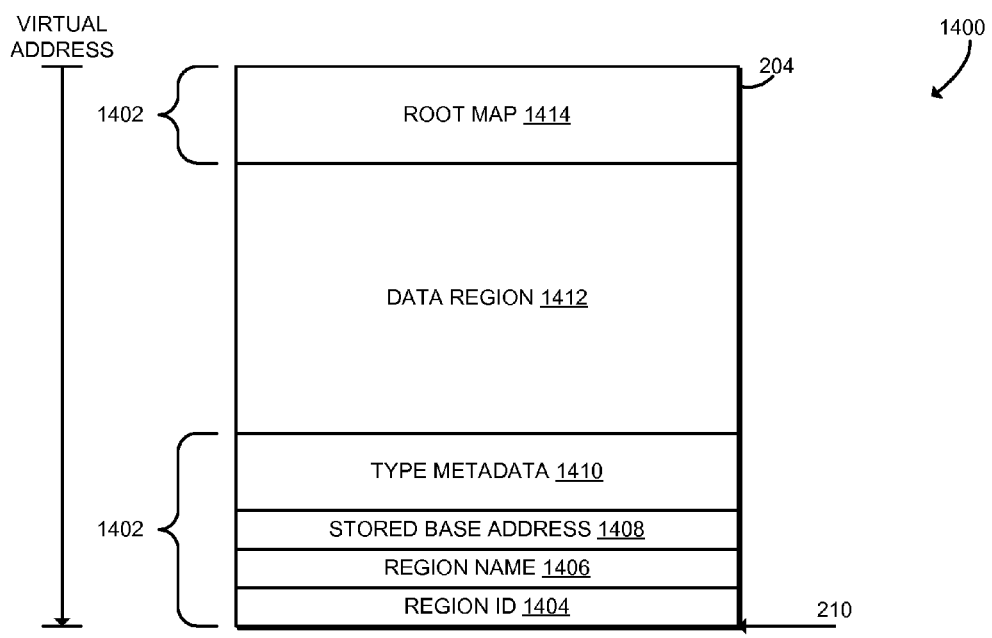
FIG. 14 is a schematic diagram of an illustrative metadata layout of a persistent memory region.

Referring now to FIG. 14, the schematic diagram 1400 illustrates one embodiment of the metadata layout of the NVRegion 204 starting at the virtual base address 210. The illustrated NVRegion 204 may correspond to the NVRegion 204 shown in FIG. 2. The metadata layout shown in FIG. 14 may be created in whole or in part, for example, by the method 1300 of FIG. 13. As shown, the NVRegion 204 includes several items of metadata 1402. As shown, the metadata 1402 may be located both at the top and the bottom of the virtual address space of the NVRegion 204. However, in other embodiments the metadata 1402 may be located at any predefined or otherwise convenient location in the persistent memory 128.

Starting from the virtual base address 210 and moving upwards in the virtual memory space, the metadata 1402 includes a region ID 1404, which may be embodied as an integer ID number assigned to the NVRegion 204 when created, opened, and/or mapped into virtual memory. The region ID 1404 may be used to identify the NVRegion 204, for example, when using the ID-in-value pointer strategy as described above in connection with FIGS. 6-8. The metadata 1402 further includes a region name 1406. The region name 1406 may be assigned to the NVRegion 204 upon creation and may be used by applications to identify the NVRegion 204 (e.g., as a parameter to an NVOpenRegion function call). The NVRegion 204 next includes a stored base address 1408. The stored base address 1408 may correspond to the virtual base address 210 or to the virtual base address of the NVRegion 204 during a previous run of an application. The stored base address 1408 may be used by the optimistic and/or pessimistic pointer strategies as described above in connection with FIGS. 9A and 9B. The metadata 1402 further includes type metadata region 1410. The type metadata region 1410 may include type definition data for all objects accessible in the NVRegion 204. The type metadata region 1410 may be generated or managed when NVRoots or referenced objects are added to the NVRegion 204. For example, the type metadata region 1410 may be managed by the method 1300 described above in connection with FIG. 13.

Above the type metadata region 1410 in the virtual address space, the NVRegion 204 includes a data region 1412. The data region 1412 includes all of the persistent memory data that may be referenced or used within the NVRegion 204. Thus, the data region 1412 may include zero or more NVRoots and an associated NVSet for each NVRoot. For example, referring to FIG. 2, the NVRoots 216, 218, 220, 222 and their respective NVSets 226, 228, 230, 232 may be stored in the data region 1412.

At the top of its virtual memory space, the NVRegion 204 includes a root map 1414. The root map 1414 records the position of each NVRoot within the NVRegion 204, and may also record the associated type and/or name of each NVRoot. The root map 1414 may be embodied as a list, an array, a vector, or other data structure that may be traversed to enumerate all of the NVRoots included in the NVRegion 204. As described above in connection with the method 1300 of FIG. 13, the root map 1414 may be generated or updated whenever a new NVRoot is added to the NVRegion. Additionally, the root map may be used to locate NVRoots when opening an NVRegion, for example by calling the NVFetchRoot function as shown in the pseudocode 1200.

Figure 15:
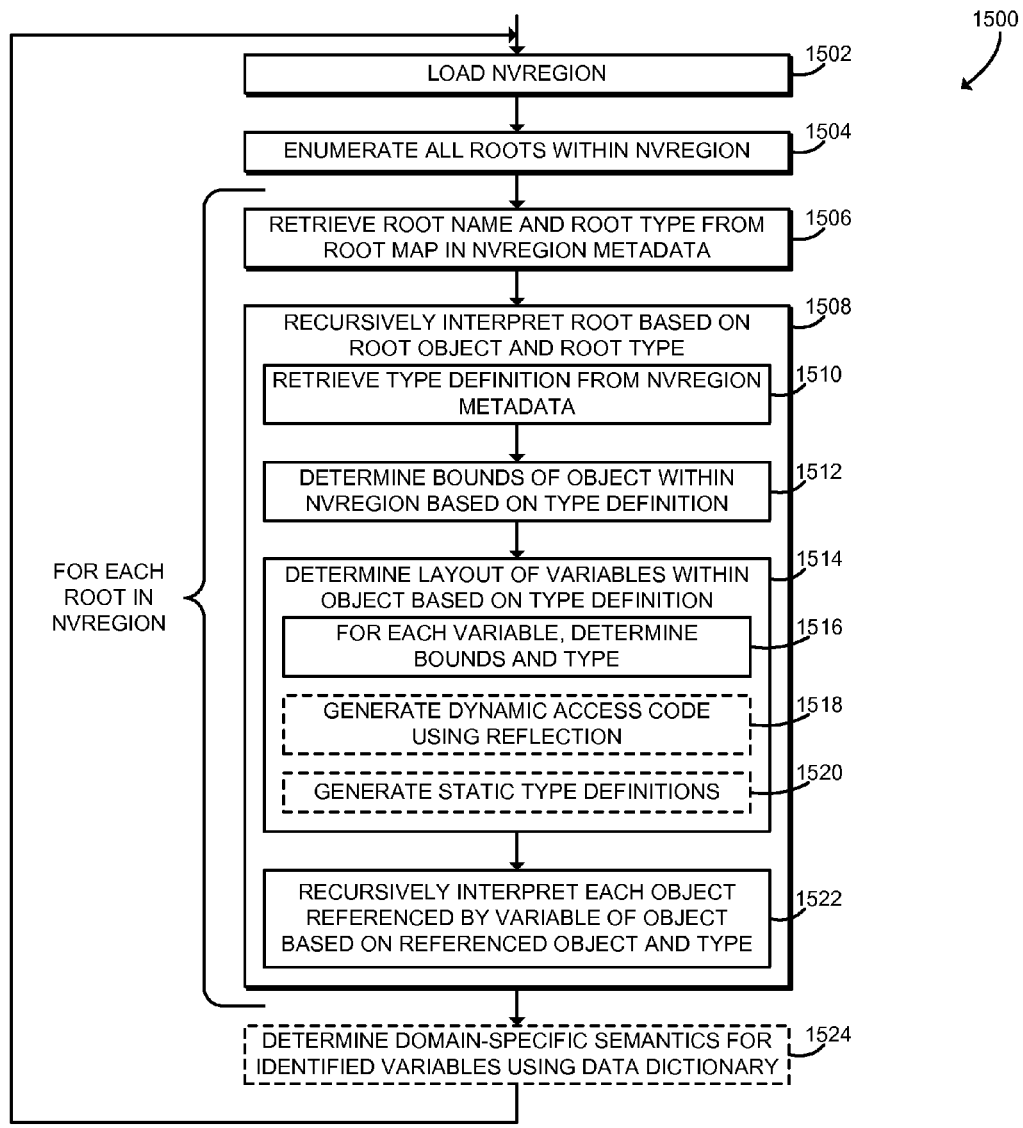
FIG. 15 is a simplified flow diagram of at least one embodiment of a method for inferring type based on metadata stored in a persistent memory region that may be executed by the computing device of FIGS. 1 and 3.

Referring now to FIG. 15, in use the computing device 100 may execute a method 1500 for persistent data type inference. The method 1500 may be executed, for example, when loading an existing NVRegion as described above in connection with block 408 of FIG. 4. The method 1500 begins in block 1502, in which the computing device 100 loads an NVRegion. The NVRegion may have been previously created by the computing device 100 or by another computing device. Additionally, the computing device 100 may not have access to external specifications of the data stored in the NVRegion such as type definitions, schemas, header files, or other data definitions. As described above, loading the NVRegion may map a previously created NVRegion stored within the persistent memory 128 to a virtual memory address accessible by a running process. The computing device 100 may use any technique to load the NVRegion including, for example, an application programming interface (API) call, system call, or other command generated by the running process.

In block 1504, the computing device 100 enumerates all NVRoots included within the NVRegion. The computing device 100 may enumerate the NVRoots in response to an API call, system call, or other command generated by the running process. The computing device 100 may enumerate the NVRoots by examining metadata stored within the NVRegion. For example, the computing device 100 may traverse the root map 1414 as shown in FIG. 14 to identify all of the NVRoots within the NVRegion 204. The computing device 100 may identify all of the enumerated NVRoots, for example, by determining a virtual memory address corresponding to each NVRoot. After enumerating the NVRoots, the computing device 100 iteratively executes blocks 1506 and 1508 for each NVRoot.

In block 1506, for an NVRoot enumerated in block 1504, the computing device 100 retrieves the root name and the root type from the NVRegion metadata. The root name and root type may be stored, for example, in the root map 1414 as shown in FIG. 14. The root name and the root type may be retrieved using API functions such as NVGetRootName and NVGetDataType, respectively. The root name may be used to obtain a pointer or other reference to the root object in memory. For example, the root name may be supplied as a parameter to the function NVFetchRoot.

In block 1508, the computing device 100 recursively interprets the NVRoot based on the root object and its associated root type. As described above, the NVRoot may be embodied as a programming object that is stored within the persistent memory 128 with a particular data type. The type of the NVRoot may define the size and layout of the NVRoot object in persistent memory. In particular, the type of the NVRoot object may define the location in memory and associated type of member variables of the NVRoot object. Interpreting the root object may allow the computing device 100 to delimit and access the variables included within the NVRoot object.

To interpret the NVRoot object, in block 1510 the computing device 100 retrieves type definition data from the type metadata region of the NVRegion metadata. For example, the computing device 100 may reference the type metadata region 1410 of the NVRegion 204 as shown in FIG. 4. In block 1512, the computing device 100 identifies the bounds of the object within the NVRegion based on the associated type definition. The bounds of the object may be defined as, for example, a starting offset and a length or a beginning virtual address and an ending virtual address. Thus, the bounds of the object may be embodied as one or more persistent memory pointers or virtual memory addresses. The size of the object within memory (and thus its length and/or ending virtual address) may be determined based on the associated type definition data. For example, the size of the NVRoot may be determined by adding the sizes of all variables included in the NVRoot (including value-type variables and reference-type variables).

In block 1514, the computing device 100 determines the layout of variables within the object based on the type definition. To determine the layout, in block 1516, the computing device 100 identifies the bounds and type of each variable within the object, based on the type definition data associated with the object. The bounds of each variable may be identified, for example, as an offset from the starting address of the object, and may be embodied as a persistent memory pointer, virtual memory address, or other offset. In some embodiments, the computing device 100 may not support determining the layout of variables having ambiguous types. For example, the computing device 100 may not be capable of determining the layout for variables having a void pointer type (e.g., void*), a union type, a polymorphic type, or other ambiguous types. In some embodiments, the computing device 100 may generate an error or exception or otherwise indicate that ambiguous types are not supported.

After identifying the bounds and type of each variable of the object, the computing device 100 may be capable of individually accessing each variable of the NVRoot. For example, in block 1518, in some embodiments the computing device 100 may generate dynamic access code for each variable using type reflection. As another example, in block 1520, in some embodiments the computing device 100 may generate static type definitions of the object and its variables. For example, the computing device 100 may generate one or more header files that may be used by source code to access the NVRoot and its variables.

In block 1522, the computing device 100 recursively interprets every object referenced by a variable of the object identified in block 1514. Reference-type variables may include pointers, persistent memory pointers, handles, object references, or any other variable of the object that references another typed data object within the persistent memory 128. To recursively interpret the referenced objects, the computing device 100 may repeat the blocks 1510 through 1522 for each referenced object. In other words, the computing device 100 may retrieve the type definition, determine the bounds, determine the layout, recursively interpret each object referenced by the referenced object, and so on, until all objects reachable from the NVRoot have been interpreted. As described above, after completing the recursive interpretation described in block 1508, the computing device 100 may repeat blocks 1506 and 1508 for the remaining NVRoots that were enumerated in block 1504.

In some embodiments, after iteratively processing each NVRoot, in block 1524 the computing device 100 may determine domain-specific semantics for the identified variables using a data dictionary. The computing device 100 may assign a semantic name to each variable defined in the data type definitions of the NVRoot and to the variables of any referenced objects. For example, the computing device 100 may associate the variables of the NVRoot and referenced objects with elements of a database schema, external type definition, or other data dictionary. After interpreting type information for the NVRegion, the method 1500 loops back to block 1502 to load additional NVRegions and interpret type information.

EXAMPLES

Illustrative examples of the technologies disclosed herein are provided below. An embodiment of the technologies may include any one or more, and any combination of, the examples described below.

Example 1 includes a computing device for persistent memory pointer access, the computing device comprising a persistent memory, wherein the persistent memory includes a nonvolatile region; and a position-independent pointer module to assign a first virtual memory address of a target memory location to a persistent memory pointer using a persistent pointer strategy, wherein the target memory location is within the nonvolatile region of the persistent memory, and wherein the persistent memory pointer is within the persistent memory; and dereference the persistent memory pointer to generate a second virtual memory address of the target memory location using the persistent pointer strategy.

Example 2 includes the subject matter of Example 1, and wherein the persistent pointer strategy comprises an off-holder strategy that translates between virtual memory addresses and persistent pointer values based on a difference between virtual memory addresses.

Example 3 includes the subject matter of any of Examples 1 and 2, and wherein the persistent memory pointer is within the nonvolatile region of the persistent memory; to assign the first virtual memory address of the target memory location to the persistent memory pointer comprises to store a difference between the first virtual memory address of the target memory location and a third virtual memory address of the persistent memory pointer into the persistent memory pointer; and to dereference the persistent memory pointer to generate the second virtual memory address comprises to add the persistent memory pointer to a fourth virtual memory address of the persistent memory pointer.

Example 4 includes the subject matter of any of Examples 1-3, and wherein the first virtual memory address equals the second virtual memory address and the third virtual memory address equals the fourth virtual memory address.

Example 5 includes the subject matter of any of Examples 1-4, and wherein the first virtual memory address does not equal the second virtual memory address and the third virtual memory address does not equal the fourth virtual memory address.

Example 6 includes the subject matter of any of Examples 1-5, and wherein the persistent pointer strategy comprises an ID-in-value strategy that stores a region ID in the persistent pointer value.

Example 7 includes the subject matter of any of Examples 1-6, and further including a nonvolatile region management module to open the nonvolatile region of the persistent memory, wherein the nonvolatile region has a virtual base address and a region ID; store, in response to opening of the nonvolatile region, the region ID of the nonvolatile region in a region ID table of the persistent memory indexed by the virtual base address; and store, in response to the opening of the nonvolatile region, the virtual base address of the nonvolatile region in a nonvolatile base address table of the persistent memory indexed by the region ID.

Example 8 includes the subject matter of any of Examples 1-7, and wherein the persistent memory pointer is within a second nonvolatile region of the persistent memory, different from the nonvolatile region.

Example 9 includes the subject matter of any of Examples 1-8, and wherein to store the region ID in the region ID table comprises to determine a virtual row address within the persistent memory as a function of the virtual base address; and store the region ID in the persistent memory at the virtual row address.

Example 10 includes the subject matter of any of Examples 1-9, and wherein to determine the virtual row address comprises to determine a nonvolatile base by performance of a bitwise AND operation on the virtual base address and a first binary value, wherein the first binary value includes a most-significant first number of bits set to zero, a next-most-significant second number of bits set to one, and a least-significant third number of bits set to zero; right-shift the nonvolatile base by a difference between the third number of bits and a fourth number of bits, wherein the region ID is represented within the fourth number of bits and the fourth number of bits is less than the third number of bits; and determine the virtual row address by performance of a bitwise OR operation on the right-shifted nonvolatile base and a second binary value, wherein the second binary value includes the most-significant first number of bits set to one and a remaining number of bits set to zero.

Example 11 includes the subject matter of any of Examples 1-10, and wherein to store the virtual base address in the nonvolatile base address table comprises to determine a virtual row address within the persistent memory as a function of the region ID; and store the virtual base address in the persistent memory at the virtual row address.

Example 12 includes the subject matter of any of Examples 1-11, and wherein the virtual base address comprises a most-significant first number of bits set to one, a next-most-significant second number of bits, and a least-significant third number of bits set to zero; the region ID is represented within a fourth number of bits, wherein the fourth number of bits is less than the third number of bits; and to determine the virtual row address comprises to left-shift the region ID by the second number of bits; and determine the virtual row address by performance of a bitwise OR operation on the left-shifted region ID and a first binary value, wherein the first binary value includes the most-significant first number of bits set to one, a next-most-significant fifth number of bits set to a second binary value, and a remaining number of bits set to zero, wherein the fifth number of bits equals the third number of bits minus the fourth number of bits, and wherein the second binary value includes all bits set to zero except for a least-significant bit set to one.

Example 13 includes the subject matter of any of Examples 1-12, and wherein to assign the first virtual memory address of the target memory location to the persistent memory pointer comprises to determine the virtual base address of the nonvolatile region as a function of the first virtual memory address; look up the region ID of the nonvolatile region from the region ID table using the virtual base address; determine an offset value as a function of the first virtual memory address; determine a persistent pointer value as a function of the region ID of the nonvolatile region and the offset value; and store the persistent pointer value in the persistent memory pointer.

Example 14 includes the subject matter of any of Examples 1-13, and wherein to look up the region ID comprises to determine a virtual row address and read the persistent memory at the virtual row address, wherein to determine the virtual row address comprises to determine a nonvolatile base by performance of a bitwise AND operation on the first virtual memory address and a first binary value, wherein the first binary value includes a most-significant first number of bits set to zero, a next-most-significant second number of bits set to one, and a least-significant third number of bits set to zero; right-shift the nonvolatile base by a difference between the third number of bits and a fourth number of bits, wherein the region ID is represented within the fourth number of bits and the fourth number of bits is less than the third number of bits; and determine the virtual row address by performance of a bitwise OR operation on the right-shifted nonvolatile base and a second binary value, wherein the second binary value includes the most-significant first number of bits set to one and a remaining number of bits set to zero; to determine the offset value comprises to perform a bitwise AND operation on the first virtual memory address and a third binary value, wherein the third binary value includes the most-significant first number of bits set to zero, the next-most-significant second number of bits set to zero, and the least-significant third number of bits set to one; and to determine the persistent pointer value comprises to left-shift the region ID by the third number of bits; and perform a bitwise OR operation on the left-shifted region ID and the offset value.

Example 15 includes the subject matter of any of Examples 1-14, and wherein to dereference the persistent memory pointer to generate the second virtual memory address comprises to determine the region ID of the nonvolatile region as a function of a persistent pointer value of the persistent memory pointer; look up the virtual base address of the nonvolatile region from the virtual base address table using the region ID; determine an offset value as a function of the persistent pointer value; and determine the second virtual memory address as a function of the offset value and the virtual base address.

Example 16 includes the subject matter of any of Examples 1-15, and wherein the virtual base address comprises a most-significant first number of bits set to one, a next-most-significant second number of bits, and a least-significant third number of bits; the region ID is represented within a fourth number of bits, wherein the fourth number of bits is less than the third number of bits; to look up the virtual base address comprises to determine a virtual row address and read the persistent memory at the virtual row address, wherein to determine the virtual row address comprises to left-shift the region ID by the second number of bits; and determine the virtual row address by performance of a bitwise OR operation on the left-shifted region ID and a first binary value, wherein the first binary value includes the most-significant first number of bits set to one, a next-most-significant fifth number of bits set to a second binary value, and a remaining number of bits set to zero, wherein the fifth number of bits equals the third number of bits minus the fourth number of bits, and wherein the second binary value includes all bits set to zero except for a least-significant bit set to one; to determine the offset value comprises to perform a bitwise AND operation on the persistent pointer value and a third binary value, wherein the third binary value includes the most-significant first number of bits set to zero, the next-most-significant second number of bits set to zero, and the least-significant third number of bits set to one; and to determine the second virtual memory address comprises to perform a bitwise OR operation on the virtual base address and the offset value.

Example 17 includes the subject matter of any of Examples 1-16, and wherein the persistent pointer strategy comprises (i) an optimistic rectification strategy to update persistent pointer values based on a stored virtual base address upon opening the nonvolatile region or (ii) a pessimistic rectification strategy to update the persistent pointer value based on a stored virtual base address upon accessing the persistent pointer value.

Example 18 includes the subject matter of any of Examples 1-17, and further including a nonvolatile region management module to open the nonvolatile region of the persistent memory in an optimistic mode or a pessimistic mode, wherein the nonvolatile region has a stored virtual base address, and wherein to open the nonvolatile region comprises to determine whether the nonvolatile region may be mapped to a virtual base address equal to the stored virtual base address; map the nonvolatile region to the virtual base address equal to the stored virtual base address in response to a determination that the nonvolatile region may be mapped to the stored virtual base address; map the nonvolatile region to a new virtual base address in response to a determination that the nonvolatile region may not be mapped to the stored virtual base address; and update, in response to opening of the nonvolatile region in the optimistic mode and mapping of the nonvolatile region to the new virtual base address, each persistent pointer value in the nonvolatile region as a function of the new virtual base address.

Example 19 includes the subject matter of any of Examples 1-18, and wherein the persistent memory pointer is within the nonvolatile region; and to assign the first virtual memory address of the target memory location to the persistent memory pointer comprises to store the first virtual memory address in the persistent memory pointer in response to opening of the nonvolatile region in the optimistic mode; and in response to opening of the nonvolatile region in the pessimistic mode: (i) determine an offset between a current virtual base address of the nonvolatile region and the stored virtual base address, (ii) subtract the offset from the first virtual memory address, and (iii) store the difference in the persistent memory pointer.

Example 20 includes the subject matter of any of Examples 1-19, and wherein to dereference the persistent memory pointer to generate the second virtual memory address comprises to retrieve the second virtual memory address from the persistent memory pointer in response to opening of the nonvolatile region in the optimistic mode; and in response to opening of the nonvolatile region in the pessimistic mode: (i) determine an offset between a current virtual base address of the nonvolatile region and the stored virtual base address and (ii) add the offset to a persistent pointer value of the persistent memory pointer to generate the second virtual memory address.

Example 21 includes a computing device for persistent memory data consistency, the computing device comprising a persistent memory to store nonvolatile data; and a data consistency module to monitor executing code for a beginning of a data consistency section that has been previously identified within the executing code; record the data consistency section as active in response to detection of the beginning of the data consistency section; log changes to the persistent memory in response to the detection of the beginning of the data consistency section; monitor the executing code for an ending of the data consistency section; commit the changes to the persistent memory atomically in response to detection of the ending of the data consistency section; and reverse the changes to the persistent memory in response to a failure of the computing device within the data consistency section.

Example 22 includes the subject matter of Example 21, and wherein the data consistency module is further to determine if no other data consistency sections are active in response to detection of the ending of the data consistency section; wherein to commit the changes comprises to commit the changes to the persistent memory atomically in response to the detection of the ending of the data consistency section and a determination that no other data consistency sections are active.

Example 23 includes the subject matter of any of Examples 21 and 22, and wherein to record the data consistency section as active comprises to record a log group identifier associated with the data consistency section; and to determine if no other data consistency sections are active comprises to determine if no other data consistency sections associated with the log group identifier are active in response to the detection of the ending of the data consistency section.

Example 24 includes a computing device for compiling source code with persistent memory support, the computing device comprising a compiler to analyze source code that includes a persistent memory pointer access; and a position-independent pointer type module to select a persistent pointer strategy in response to analysis of the source code; and generate, in response to the analysis of the source code, output code for the persistent memory pointer access; wherein the output code is to cause a target computing device to assign a first virtual memory address of a target memory location to a persistent memory pointer using the persistent pointer strategy, wherein the target memory location is within a nonvolatile region of a persistent memory of the target computing device, and wherein the persistent memory pointer is within the persistent memory of the target computing device; and dereference the persistent memory pointer to generate a second virtual memory address of the target memory location using the persistent pointer strategy.

Example 25 includes the subject matter of Example 24, and wherein to select the persistent pointer strategy comprises to select the persistent pointer strategy as a function of a programmer-specified pointer type defined in the source code.

Example 26 includes the subject matter of any of Examples 24 and 25, and wherein the persistent pointer strategy comprises an off-holder strategy that translates between virtual memory addresses and persistent pointer values based on a difference between virtual memory addresses.

Example 27 includes the subject matter of any of Examples 24-26, and wherein the persistent memory pointer is within the nonvolatile region of the persistent memory; to assign the first virtual memory address of the target memory location to the persistent memory pointer comprises to store a difference between the first virtual memory address of the target memory location and a third virtual memory address of the persistent memory pointer into the persistent memory pointer; and to dereference the persistent memory pointer to generate the second virtual memory address comprises to add the persistent memory pointer to a fourth virtual memory address of the persistent memory pointer.

Example 28 includes the subject matter of any of Examples 24-27, and wherein the first virtual memory address equals the second virtual memory address and the third virtual memory address equals the fourth virtual memory address.

Example 29 includes the subject matter of any of Examples 24-28, and wherein the first virtual memory address does not equal the second virtual memory address and the third virtual memory address does not equal the fourth virtual memory address.

Example 30 includes the subject matter of any of Examples 24-29, and wherein the persistent pointer strategy comprises an ID-in-value strategy that stores a region ID in the persistent pointer value.

Example 31 includes the subject matter of any of Examples 24-30, and wherein the output code is further to cause the target computing device to open the nonvolatile region of the persistent memory, wherein the nonvolatile region has a virtual base address and a region ID; store, in response to opening of the nonvolatile region, the region ID of the nonvolatile region in a region ID table of the persistent memory indexed by the virtual base address; and store, in response to the opening of the nonvolatile region, the virtual base address of the nonvolatile region in a nonvolatile base address table of the persistent memory indexed by the region ID.

Example 32 includes the subject matter of any of Examples 24-31, and wherein the persistent memory pointer is within a second nonvolatile region of the persistent memory, different from the nonvolatile region.

Example 33 includes the subject matter of any of Examples 24-32, and wherein to store the region ID in the region ID table comprises to determine a virtual row address within the persistent memory as a function of the virtual base address; and store the region ID in the persistent memory at the virtual row address.

Example 34 includes the subject matter of any of Examples 24-33, and wherein to determine the virtual row address comprises to determine a nonvolatile base by performance of a bitwise AND operation on the virtual base address and a first binary value, wherein the first binary value includes a most-significant first number of bits set to zero, a next-most-significant second number of bits set to one, and a least-significant third number of bits set to zero; right-shift the nonvolatile base by a difference between the third number of bits and a fourth number of bits, wherein the region ID is represented within the fourth number of bits and the fourth number of bits is less than the third number of bits; and determine the virtual row address by performance of a bitwise OR operation on the right-shifted nonvolatile base and a second binary value, wherein the second binary value includes the most-significant first number of bits set to one and a remaining number of bits set to zero.

Example 35 includes the subject matter of any of Examples 24-34, and wherein to store the virtual base address in the nonvolatile base address table comprises to determine a virtual row address within the persistent memory as a function of the region ID; and store the virtual base address in the persistent memory at the virtual row address.

Example 36 includes the subject matter of any of Examples 24-35, and wherein the virtual base address comprises a most-significant first number of bits set to one, a next-most-significant second number of bits, and a least-significant third number of bits set to zero; the region ID is represented within a fourth number of bits, wherein the fourth number of bits is less than the third number of bits; and to determine the virtual row address comprises to left-shift the region ID by the second number of bits; and determine the virtual row address by performance of a bitwise OR operation on the left-shifted region ID and a first binary value, wherein the first binary value includes the most-significant first number of bits set to one, a next-most-significant fifth number of bits set to a second binary value, and a remaining number of bits set to zero, wherein the fifth number of bits equals the third number of bits minus the fourth number of bits, and wherein the second binary value includes all bits set to zero except for a least-significant bit set to one.

Example 37 includes the subject matter of any of Examples 24-36, and wherein to assign the first virtual memory address of the target memory location to the persistent memory pointer comprises to determine the virtual base address of the nonvolatile region as a function of the first virtual memory address; look up the region ID of the nonvolatile region from the region ID table using the virtual base address; determine an offset value as a function of the first virtual memory address; determine a persistent pointer value as a function of the region ID of the nonvolatile region and the offset value; and store the persistent pointer value in the persistent memory pointer.

Example 38 includes the subject matter of any of Examples 24-37, and wherein to look up the region ID comprises to determine a virtual row address and read the persistent memory at the virtual row address, wherein to determine the virtual row address comprises to determine a nonvolatile base by performance of a bitwise AND operation on the first virtual memory address and a first binary value, wherein the first binary value includes a most-significant first number of bits set to zero, a next-most-significant second number of bits set to one, and a least-significant third number of bits set to zero; right-shift the nonvolatile base by a difference between the third number of bits and a fourth number of bits, wherein the region ID is represented within the fourth number of bits and the fourth number of bits is less than the third number of bits; and determine the virtual row address by performance of a bitwise OR operation on the right-shifted nonvolatile base and a second binary value, wherein the second binary value includes the most-significant first number of bits set to one and a remaining number of bits set to zero; to determine the offset value comprises to perform a bitwise AND operation on the first virtual memory address and a third binary value, wherein the third binary value includes the most-significant first number of bits set to zero, the next-most-significant second number of bits set to zero, and the least-significant third number of bits set to one; and to determine the persistent pointer value comprises to left-shift the region ID by the third number of bits; and perform a bitwise OR operation on the left-shifted region ID and the offset value.

Example 39 includes the subject matter of any of Examples 24-38, and wherein to dereference the persistent memory pointer to generate the second virtual memory address comprises to determine the region ID of the nonvolatile region as a function of a persistent pointer value of the persistent memory pointer; look up the virtual base address of the nonvolatile region from the virtual base address table using the region ID; determine an offset value as a function of the persistent pointer value; and determine the second virtual memory address as a function of the offset value and the virtual base address.

Example 40 includes the subject matter of any of Examples 24-39, and wherein the virtual base address comprises a most-significant first number of bits set to one, a next-most-significant second number of bits, and a least-significant third number of bits; the region ID is represented within a fourth number of bits, wherein the fourth number of bits is less than the third number of bits; to look up the virtual base address comprises to determine a virtual row address and read the persistent memory at the virtual row address, wherein to determine the virtual row address comprises to left-shift the region ID by the second number of bits; and determine the virtual row address by performance of a bitwise OR operation on the left-shifted region ID and a first binary value, wherein the first binary value includes the most-significant first number of bits set to one, a next-most-significant fifth number of bits set to a second binary value, and a remaining number of bits set to zero, wherein the fifth number of bits equals the third number of bits minus the fourth number of bits, and wherein the second binary value includes all bits set to zero except for a least-significant bit set to one; to determine the offset value comprises to perform a bitwise AND operation on the persistent pointer value and a third binary value, wherein the third binary value includes the most-significant first number of bits set to zero, the next-most-significant second number of bits set to zero, and the least-significant third number of bits set to one; and to determine the second virtual memory address comprises to perform a bitwise OR operation on the virtual base address and the offset value.

Example 41 includes the subject matter of any of Examples 24-40, and wherein the persistent pointer strategy comprises (i) an optimistic rectification strategy to update persistent pointer values based on a stored virtual base address upon opening the nonvolatile region or (ii) a pessimistic rectification strategy to update the persistent pointer value based on a stored virtual base address upon accessing the persistent pointer value.

Example 42 includes the subject matter of any of Examples 24-41, and wherein the output code is further to cause the target computing device to open the nonvolatile region of the persistent memory in an optimistic mode or a pessimistic mode, wherein the nonvolatile region has a stored virtual base address, wherein to open the nonvolatile region comprises to determine whether the nonvolatile region may be mapped to a virtual base address equal to the stored virtual base address; map the nonvolatile region to the virtual base address equal to the stored virtual base address in response to a determination that the nonvolatile region may be mapped to the stored virtual base address; map the nonvolatile region to a new virtual base address in response to a determination that the nonvolatile region may not be mapped to the stored virtual base address; and update, in response to opening of the nonvolatile region in the optimistic mode and mapping of the nonvolatile region to the new virtual base address, each persistent pointer value in the nonvolatile region as a function of the new virtual base address.

Example 43 includes the subject matter of any of Examples 24-42, and wherein the persistent memory pointer is within the nonvolatile region; and to assign the first virtual memory address of the target memory location to the persistent memory pointer comprises to store the first virtual memory address in the persistent memory pointer in response to opening of the nonvolatile region in the optimistic mode; and in response to opening of the nonvolatile region in the pessimistic mode: (i) determine an offset between a current virtual base address of the nonvolatile region and the stored virtual base address, (ii) subtract the offset from the first virtual memory address, and (iii) store the difference in the persistent memory pointer.

Example 44 includes the subject matter of any of Examples 24-43, and wherein to dereference the persistent memory pointer to generate the second virtual memory address comprises to retrieve the second virtual memory address from the persistent memory pointer in response to opening of the nonvolatile region in the optimistic mode; and in response to opening of the nonvolatile region in the pessimistic mode: (i) determine an offset between a current virtual base address of the nonvolatile region and the stored virtual base address and (ii) add the offset to a persistent pointer value of the persistent memory pointer to generate the second virtual memory address.

Example 45 includes a computing device for compiling source code with persistent memory data consistency support, the computing device comprising a compiler to analyze source code that includes a data consistency section that has been previously identified within the source code; and a data consistency section module to generate, in response to analysis of the source code, output code for the data consistency section; wherein the output code is to cause a target computing device to monitor executing code for a beginning of the data consistency section within the executing code;

record the data consistency section as active in response to detection of the beginning of the data consistency section; log changes to persistent memory of the target computing device in response to the detection of the beginning of the data consistency section; monitor the executing code for an ending of the data consistency section; commit the changes to the persistent memory atomically in response to detection of the ending of the data consistency section; and reverse the changes to the persistent memory in response to a failure of the target computing device within the data consistency section.

Example 46 includes the subject matter of Example 45, and wherein the output code is further to cause the target computing device to determine if no other data consistency sections are active in response to the detection of the ending of the data consistency section; and wherein to commit the changes comprises to commit the changes to the persistent memory atomically in response to the detection of the ending of the data consistency section and a determination that no other data consistency sections are active.

Example 47 includes the subject matter of any of Examples 45 and 46, and wherein to record the data consistency section as active comprises to record a log group identifier associated with the data consistency section; and to determine if no other data consistency sections are active comprises to determine if no other data consistency sections associated with the log group identifier are active in response to the detection of the ending of the data consistency section.

Example 48 includes a computing device for inferring persistent memory type data, the computing device comprising a persistent memory having a nonvolatile region, wherein the nonvolatile region includes a type metadata region, a root map region, and a data region; a nonvolatile region management module to load the nonvolatile region of the persistent memory; and a type inference module to, in response to loading of the nonvolatile region identify a root object within the data region of the nonvolatile region using the root map region; identify a type of the root object within the type metadata region using the root map region; and recursively interpret the root object as a function of the root object and the type of the root object, wherein to recursively interpret the root object comprises to retrieve a type definition of the type of the root object from the type metadata region of the nonvolatile region of the persistent memory; determine bounds of the root object as a function of the type definition; identify one or more variables within the root object as a function of the type definition, wherein to identify a variable comprises to determine bounds of the variable and a type of the variable; and recursively interpret each object referenced by a variable of the variables within the root object as a function of the object referenced by the variable and the type of the reference variable.

Example 49 includes the subject matter of Examples 48, and wherein the bounds of the root object comprises a start address of the root object and a size of the root object; and the bounds of the variable comprises an offset of the reference variable from the start address of the root object.

Example 50 includes the subject matter of any of Examples 48 and 49, and wherein to recursively interpret the root object comprises to dynamically generate code to access the root object; and dynamically generate code to access each of the one or more variables within the root object.

Example 51 includes the subject matter of any of Examples 48-50, and wherein to recursively interpret the root object comprises to generate a static type definition of the type of the root object; and generate a static type definition of the type of each reference variable of the variables within the root object.

Example 52 includes the subject matter of any of Examples 48-51, and wherein the type inference module is further to determine domain-specific semantics of the type of the root object in response to recursive interpretation of the root object.

Example 53 includes a method for persistent memory pointer access, the method comprising assigning, by a computing device, a first virtual memory address of a target memory location to a persistent memory pointer using a persistent pointer strategy, wherein the target memory location is within a nonvolatile region of a persistent memory of the computing device, and wherein the persistent memory pointer is within the persistent memory of the computing device; and dereferencing, by the computing device, the persistent memory pointer to generate a second virtual memory address of the target memory location using the persistent pointer strategy.

Example 54 includes the subject matter of Example 53, and wherein the persistent pointer strategy comprises an off-holder strategy that translates between virtual memory addresses and persistent pointer values based on a difference between virtual memory addresses.

Example 55 includes the subject matter of any of Examples 53 and 54, and wherein the persistent memory pointer is within the nonvolatile region of the persistent memory; assigning the first virtual memory address of the target memory location to the persistent memory pointer comprises storing a difference between the first virtual memory address of the target memory location and a third virtual memory address of the persistent memory pointer into the persistent memory pointer; and dereferencing the persistent memory pointer to generate the second virtual memory address comprises adding the persistent memory pointer to a fourth virtual memory address of the persistent memory pointer.

Example 56 includes the subject matter of any of Examples 53-55, and wherein the first virtual memory address equals the second virtual memory address and the third virtual memory address equals the fourth virtual memory address.

Example 57 includes the subject matter of any of Examples 53-56, and wherein the first virtual memory address does not equal the second virtual memory address and the third virtual memory address does not equal the fourth virtual memory address.

Example 58 includes the subject matter of any of Examples 53-57, and wherein the persistent pointer strategy comprises an ID-in-value strategy that stores a region ID in the persistent pointer value.

Example 59 includes the subject matter of any of Examples 53-58, and further including opening, by the computing device, the nonvolatile region of the persistent memory, wherein the nonvolatile region has a virtual base address and a region ID; storing, by the computing device in response to opening the nonvolatile region, the region ID of the nonvolatile region in a region ID table of the persistent memory indexed by the virtual base address; and storing, by the computing device in response to opening the nonvolatile region, the virtual base address of the nonvolatile region in a nonvolatile base address table of the persistent memory indexed by the region ID.

Example 60 includes the subject matter of any of Examples 53-59, and wherein the persistent memory pointer is within a second nonvolatile region of the persistent memory, different from the nonvolatile region.

Example 61 includes the subject matter of any of Examples 53-60, and wherein storing the region ID in the region ID table comprises determining a virtual row address within the persistent memory as a function of the virtual base address; and storing the region ID in the persistent memory at the virtual row address.

Example 62 includes the subject matter of any of Examples 53-61, and wherein determining the virtual row address comprises determining a nonvolatile base by performing a bitwise AND operation on the virtual base address and a first binary value, wherein the first binary value includes a most-significant first number of bits set to zero, a next-most-significant second number of bits set to one, and a least-significant third number of bits set to zero; right-shifting the nonvolatile base by a difference between the third number of bits and a fourth number of bits, wherein the region ID is represented within the fourth number of bits and the fourth number of bits is less than the third number of bits; and determining the virtual row address by performing a bitwise OR operation on the right-shifted nonvolatile base and a second binary value, wherein the second binary value includes the most-significant first number of bits set to one and a remaining number of bits set to zero.

Example 63 includes the subject matter of any of Examples 53-62, and wherein storing the virtual base address in the nonvolatile base address table comprises determining a virtual row address within the persistent memory as a function of the region ID; and storing the virtual base address in the persistent memory at the virtual row address.

Example 64 includes the subject matter of any of Examples 53-63, and wherein the virtual base address comprises a most-significant first number of bits set to one, a next-most-significant second number of bits, and a least-significant third number of bits set to zero; the region ID is represented within a fourth number of bits, wherein the fourth number of bits is less than the third number of bits; and determining the virtual row address comprises left-shifting the region ID by the second number of bits; and determining the virtual row address by performing a bitwise OR operation on the left-shifted region ID and a first binary value, wherein the first binary value includes the most-significant first number of bits set to one, a next-most-significant fifth number of bits set to a second binary value, and a remaining number of bits set to zero, wherein the fifth number of bits equals the third number of bits minus the fourth number of bits, and wherein the second binary value includes all bits set to zero except for a least-significant bit set to one.

Example 65 includes the subject matter of any of Examples 53-64, and wherein assigning the first virtual memory address of the target memory location to the persistent memory pointer comprises determining the virtual base address of the nonvolatile region as a function of the first virtual memory address; looking up the region ID of the nonvolatile region from the region ID table using the virtual base address; determining an offset value as a function of the first virtual memory address; determining a persistent pointer value as a function of the region ID of the nonvolatile region and the offset value; and storing the persistent pointer value in the persistent memory pointer.

Example 66 includes the subject matter of any of Examples 53-65, and wherein looking up the region ID comprises determining a virtual row address and reading the persistent memory at the virtual row address, wherein determining the virtual row address comprises determining a nonvolatile base by performing a bitwise AND operation on the first virtual memory address and a first binary value, wherein the first binary value includes a most-significant first number of bits set to zero, a next-most-significant second number of bits set to one, and a least-significant third number of bits set to zero; right-shifting the nonvolatile base by a difference between the third number of bits and a fourth number of bits, wherein the region ID is represented within the fourth number of bits and the fourth number of bits is less than the third number of bits; and determining the virtual row address by performing a bitwise OR operation on the right-shifted nonvolatile base and a second binary value, wherein the second binary value includes the most-significant first number of bits set to one and a remaining number of bits set to zero; determining the offset value comprises performing a bitwise AND operation on the first virtual memory address and a third binary value, wherein the third binary value includes the most-significant first number of bits set to zero, the next-most-significant second number of bits set to zero, and the least-significant third number of bits set to one; and determining the persistent pointer value comprises left-shifting the region ID by the third number of bits; and performing a bitwise OR operation on the left-shifted region ID and the offset value.

Example 67 includes the subject matter of any of Examples 53-66, and wherein dereferencing the persistent memory pointer to generate the second virtual memory address comprises determining the region ID of the nonvolatile region as a function of a persistent pointer value of the persistent memory pointer; looking up the virtual base address of the nonvolatile region from the virtual base address table using the region ID; determining an offset value as a function of the persistent pointer value; and determining the second virtual memory address as a function of the offset value and the virtual base address.

Example 68 includes the subject matter of any of Examples 53-67, and wherein the virtual base address comprises a most-significant first number of bits set to one, a next-most-significant second number of bits, and a least-significant third number of bits; the region ID is represented within a fourth number of bits, wherein the fourth number of bits is less than the third number of bits; looking up the virtual base address comprises determining a virtual row address and reading the persistent memory at the virtual row address, wherein determining the virtual row address comprises left-shifting the region ID by the second number of bits; and determining the virtual row address by performing a bitwise OR operation on the left-shifted region ID and a first binary value, wherein the first binary value includes the most-significant first number of bits set to one, a next-most-significant fifth number of bits set to a second binary value, and a remaining number of bits set to zero, wherein the fifth number of bits equals the third number of bits minus the fourth number of bits, and wherein the second binary value includes all bits set to zero except for a least-significant bit set to one; determining the offset value comprises performing a bitwise AND operation on the persistent pointer value and a third binary value, wherein the third binary value includes the most-significant first number of bits set to zero, the next-most-significant second number of bits set to zero, and the least-significant third number of bits set to one; and determining the second virtual memory address comprises performing a bitwise OR operation on the virtual base address and the offset value.

Example 69 includes the subject matter of any of Examples 53-68, and wherein the persistent pointer strategy comprises (i) an optimistic rectification strategy to update persistent pointer values based on a stored virtual base address upon opening the nonvolatile region or (ii) a pessimistic rectification strategy to update the persistent pointer value based on a stored virtual base address upon accessing the persistent pointer value.

Example 70 includes the subject matter of any of Examples 53-69, and further including opening, by the computing device, the nonvolatile region of the persistent memory in an optimistic mode or a pessimistic mode, wherein the nonvolatile region has a stored virtual base address, wherein opening the nonvolatile region comprises determining whether the nonvolatile region may be mapped to a virtual base address equal to the stored virtual base address; mapping the nonvolatile region to the virtual base address equal to the stored virtual base address in response to determining that the nonvolatile region may be mapped to the stored virtual base address; mapping the nonvolatile region to a new virtual base address in response to determining that the nonvolatile region may not be mapped to the stored virtual base address; and updating, in response to opening the nonvolatile region in the optimistic mode and mapping the nonvolatile region to the new virtual base address, each persistent pointer value in the nonvolatile region as a function of the new virtual base address.

Example 71 includes the subject matter of any of Examples 53-70, and wherein the persistent memory pointer is within the nonvolatile region; and assigning the first virtual memory address of the target memory location to the persistent memory pointer comprises storing the first virtual memory address in the persistent memory pointer in response to opening the nonvolatile region in the optimistic mode; and in response to opening the nonvolatile region in the pessimistic mode: (i) determining an offset between a current virtual base address of the nonvolatile region and the stored virtual base address, (ii) subtracting the offset from the first virtual memory address, and (iii) storing the difference in the persistent memory pointer.

Example 72 includes the subject matter of any of Examples 53-71, and wherein dereferencing the persistent memory pointer to generate the second virtual memory address comprises retrieving the second virtual memory address from the persistent memory pointer in response to opening the nonvolatile region in the optimistic mode; and in response to opening the nonvolatile region in the pessimistic mode: (i) determining an offset between a current virtual base address of the nonvolatile region and the stored virtual base address and (ii) adding the offset to a persistent pointer value of the persistent memory pointer to generate the second virtual memory address.

Example 73 includes a method for persistent memory data consistency, the method comprising monitoring, by a computing device, executing code for a beginning of a data consistency section that has been previously identified within the executing code; recording, by the computing device, the data consistency section as active in response to detecting the beginning of the data consistency section; logging, by the computing device, changes to persistent memory in response to detecting the beginning of the data consistency section; monitoring, by the computing device, the executing code for an ending of the data consistency section; committing, by the computing device, the changes to the persistent memory atomically in response to detecting the ending of the data consistency section; and reversing, by the computing device, the changes to the persistent memory in response to a failure of the computing device within the data consistency section.

Example 74 includes the subject matter of Example 73, and further including determining, by the computing device, if no other data consistency sections are active in response to detecting the ending of the data consistency section; wherein committing the changes comprises committing the changes to the persistent memory atomically in response to detecting the ending of the data consistency section and determining that no other data consistency sections are active.

Example 75 includes the subject matter of any of Examples 73 and 74, and wherein recording the data consistency section as active comprises recording a log group identifier associated with the data consistency section; and determining if no other data consistency sections are active comprises determining if no other data consistency sections associated with the log group identifier are active in response to detecting the ending of the data consistency section.

Example 76 includes a method for compiling code with persistent memory support, the method comprising analyzing, by a computing device, source code including a persistent memory pointer access; selecting, by the computing device, a persistent pointer strategy in response to analyzing the source code; and generating, by a computing device in response to analyzing the source code, output code for the persistent memory pointer access, wherein the output code is to cause a target computing device to assign a first virtual memory address of a target memory location to a persistent memory pointer using the persistent pointer strategy, wherein the target memory location is within a nonvolatile region of a persistent memory of the target computing device, and wherein the persistent memory pointer is within the persistent memory of the target computing device; and dereference the persistent memory pointer to generate a second virtual memory address of the target memory location using the persistent pointer strategy.

Example 77 includes the subject matter of Example 76, and wherein selecting the persistent pointer strategy comprises selecting the persistent pointer strategy as a function of a programmer-specified pointer type defined in the source code.

Example 78 includes the subject matter of any of Examples 76 and 77, and wherein the persistent pointer strategy comprises an off-holder strategy that translates between virtual memory addresses and persistent pointer values based on a difference between virtual memory addresses.

Example 79 includes the subject matter of any of Examples 76-78, and wherein the persistent memory pointer is within the nonvolatile region of the persistent memory; to assign the first virtual memory address of the target memory location to the persistent memory pointer comprises to store a difference between the first virtual memory address of the target memory location and a third virtual memory address of the persistent memory pointer into the persistent memory pointer; and to dereference the persistent memory pointer to generate the second virtual memory address comprises to add the persistent memory pointer to a fourth virtual memory address of the persistent memory pointer.

Example 80 includes the subject matter of any of Examples 76-79, and wherein the first virtual memory address equals the second virtual memory address and the third virtual memory address equals the fourth virtual memory address.

Example 81 includes the subject matter of any of Examples 76-80, and wherein the first virtual memory address does not equal the second virtual memory address and the third virtual memory address does not equal the fourth virtual memory address.

Example 82 includes the subject matter of any of Examples 76-81, and wherein the persistent pointer strategy comprises an ID-in-value strategy that stores a region ID in the persistent pointer value.

Example 83 includes the subject matter of any of Examples 76-82, and wherein the output code is further to cause the target computing device to open the nonvolatile region of the persistent memory, wherein the nonvolatile region has a virtual base address and a region ID; store, in response to opening of the nonvolatile region, the region ID of the nonvolatile region in a region ID table of the persistent memory indexed by the virtual base address; and store, in response to the opening of the nonvolatile region, the virtual base address of the nonvolatile region in a nonvolatile base address table of the persistent memory indexed by the region ID.

Example 84 includes the subject matter of any of Examples 76-83, and wherein the persistent memory pointer is within a second nonvolatile region of the persistent memory, different from the nonvolatile region.

Example 85 includes the subject matter of any of Examples 76-84, and wherein to store the region ID in the region ID table comprises to determine a virtual row address within the persistent memory as a function of the virtual base address; and store the region ID in the persistent memory at the virtual row address.

Example 86 includes the subject matter of any of Examples 76-85, and wherein to determine the virtual row address comprises to determine a nonvolatile base by performance of a bitwise AND operation on the virtual base address and a first binary value, wherein the first binary value includes a most-significant first number of bits set to zero, a next-most-significant second number of bits set to one, and a least-significant third number of bits set to zero; right-shift the nonvolatile base by a difference between the third number of bits and a fourth number of bits, wherein the region ID is represented within the fourth number of bits and the fourth number of bits is less than the third number of bits; and determine the virtual row address by performance of a bitwise OR operation on the right-shifted nonvolatile base and a second binary value, wherein the second binary value includes the most-significant first number of bits set to one and a remaining number of bits set to zero.

Example 87 includes the subject matter of any of Examples 76-86, and wherein to store the virtual base address in the nonvolatile base address table comprises to determine a virtual row address within the persistent memory as a function of the region ID; and store the virtual base address in the persistent memory at the virtual row address.

Example 88 includes the subject matter of any of Examples 76-87, and wherein the virtual base address comprises a most-significant first number of bits set to one, a next-most-significant second number of bits, and a least-significant third number of bits set to zero; the region ID is represented within a fourth number of bits, wherein the fourth number of bits is less than the third number of bits; and to determine the virtual row address comprises to left-shift the region ID by the second number of bits; and determine the virtual row address by performance of a bitwise OR operation on the left-shifted region ID and a first binary value, wherein the first binary value includes the most-significant first number of bits set to one, a next-most-significant fifth number of bits set to a second binary value, and a remaining number of bits set to zero, wherein the fifth number of bits equals the third number of bits minus the fourth number of bits, and wherein the second binary value includes all bits set to zero except for a least-significant bit set to one.

Example 89 includes the subject matter of any of Examples 76-88, and wherein to assign the first virtual memory address of the target memory location to the persistent memory pointer comprises to determine the virtual base address of the nonvolatile region as a function of the first virtual memory address; look up the region ID of the nonvolatile region from the region ID table using the virtual base address; determine an offset value as a function of the first virtual memory address; determine a persistent pointer value as a function of the region ID of the nonvolatile region and the offset value; and store the persistent pointer value in the persistent memory pointer.

Example 90 includes the subject matter of any of Examples 76-89, and wherein to look up the region ID comprises to determine a virtual row address and read the persistent memory at the virtual row address, wherein to determine the virtual row address comprises to determine a nonvolatile base by performance of a bitwise AND operation on the first virtual memory address and a first binary value, wherein the first binary value includes a most-significant first number of bits set to zero, a next-most-significant second number of bits set to one, and a least-significant third number of bits set to zero; right-shift the nonvolatile base by a difference between the third number of bits and a fourth number of bits, wherein the region ID is represented within the fourth number of bits and the fourth number of bits is less than the third number of bits; and determine the virtual row address by performance of a bitwise OR operation on the right-shifted nonvolatile base and a second binary value, wherein the second binary value includes the most-significant first number of bits set to one and a remaining number of bits set to zero; to determine the offset value comprises to perform a bitwise AND operation on the first virtual memory address and a third binary value, wherein the third binary value includes the most-significant first number of bits set to zero, the next-most-significant second number of bits set to zero, and the least-significant third number of bits set to one; and to determine the persistent pointer value comprises to left-shift the region ID by the third number of bits; and perform a bitwise OR operation on the left-shifted region ID and the offset value.

Example 91 includes the subject matter of any of Examples 76-90, and wherein to dereference the persistent memory pointer to generate the second virtual memory address comprises to determine the region ID of the nonvolatile region as a function of a persistent pointer value of the persistent memory pointer; look up the virtual base address of the nonvolatile region from the virtual base address table using the region ID; determine an offset value as a function of the persistent pointer value; and determine the second virtual memory address as a function of the offset value and the virtual base address.

Example 92 includes the subject matter of any of Examples 76-91, and wherein the virtual base address comprises a most-significant first number of bits set to one, a next-most-significant second number of bits, and a least-significant third number of bits; the region ID is represented within a fourth number of bits, wherein the fourth number of bits is less than the third number of bits; to look up the virtual base address comprises to determine a virtual row address and read the persistent memory at the virtual row address, wherein to determine the virtual row address comprises to left-shift the region ID by the second number of bits; and determine the virtual row address by performance of a bitwise OR operation on the left-shifted region ID and a first binary value, wherein the first binary value includes the most-significant first number of bits set to one, a next-most-significant fifth number of bits set to a second binary value, and a remaining number of bits set to zero, wherein the fifth number of bits equals the third number of bits minus the fourth number of bits, and wherein the second binary value includes all bits set to zero except for a least-significant bit set to one; to determine the offset value comprises to perform a bitwise AND operation on the persistent pointer value and a third binary value, wherein the third binary value includes the most-significant first number of bits set to zero, the next-most-significant second number of bits set to zero, and the least-significant third number of bits set to one; and to determine the second virtual memory address comprises to perform a bitwise OR operation on the virtual base address and the offset value.

Example 93 includes the subject matter of any of Examples 76-92, and wherein the persistent pointer strategy comprises (i) an optimistic rectification strategy to update persistent pointer values based on a stored virtual base address upon opening the nonvolatile region or (ii) a pessimistic rectification strategy to update the persistent pointer value based on a stored virtual base address upon accessing the persistent pointer value.

Example 94 includes the subject matter of any of Examples 76-93, and wherein the output code is further to cause the target computing device to open the nonvolatile region of the persistent memory in an optimistic mode or a pessimistic mode, wherein the nonvolatile region has a stored virtual base address, wherein to open the nonvolatile region comprises to determine whether the nonvolatile region may be mapped to a virtual base address equal to the stored virtual base address; map the nonvolatile region to the virtual base address equal to the stored virtual base address in response to a determination that the nonvolatile region may be mapped to the stored virtual base address; map the nonvolatile region to a new virtual base address in response to a determination that the nonvolatile region may not be mapped to the stored virtual base address; and update, in response to opening of the nonvolatile region in the optimistic mode and mapping of the nonvolatile region to the new virtual base address, each persistent pointer value in the nonvolatile region as a function of the new virtual base address.

Example 95 includes the subject matter of any of Examples 76-94, and wherein the persistent memory pointer is within the nonvolatile region; and to assign the first virtual memory address of the target memory location to the persistent memory pointer comprises to store the first virtual memory address in the persistent memory pointer in response to opening of the nonvolatile region in the optimistic mode; and in response to opening of the nonvolatile region in the pessimistic mode: (i) determine an offset between a current virtual base address of the nonvolatile region and the stored virtual base address, (ii) subtract the offset from the first virtual memory address, and (iii) store the difference in the persistent memory pointer.

Example 96 includes the subject matter of any of Examples 76-95, and wherein to dereference the persistent memory pointer to generate the second virtual memory address comprises to retrieve the second virtual memory address from the persistent memory pointer in response to opening of the nonvolatile region in the optimistic mode; and in response to opening of the nonvolatile region in the pessimistic mode: (i) determine an offset between a current virtual base address of the nonvolatile region and the stored virtual base address and (ii) add the offset to a persistent pointer value of the persistent memory pointer to generate the second virtual memory address.

Example 97 includes a method for compiling code with persistent memory data consistency support, the method comprising analyzing, by a computing device, source code including a data consistency section that has been previously identified within the source code; and generating, by a computing device in response to analyzing the source code, output code for the data consistency section, wherein the output code is to cause a target computing device to monitor executing code for a beginning of the data consistency section within the executing code; record the data consistency section as active in response to detection of the beginning of the data consistency section; log changes to persistent memory of the target computing device in response to the detection of the beginning of the data consistency section; monitor the executing code for an ending of the data consistency section; commit the changes to the persistent memory atomically in response to detection of the ending of the data consistency section; and reverse the changes to the persistent memory in response to a failure of the target computing device within the data consistency section.

Example 98 includes the subject matter of Example 97, and wherein the output code is further to cause the target computing device to determine if no other data consistency sections are active in response to the detection of the ending of the data consistency section; and wherein to commit the changes comprises to commit the changes to the persistent memory atomically in response to the detection of the ending of the data consistency section and a determination that no other data consistency sections are active.

Example 99 includes the subject matter of any of Examples 97 and 98, and wherein to record the data consistency section as active comprises to record a log group identifier associated with the data consistency section; and to determine if no other data consistency sections are active comprises to determine if no other data consistency sections associated with the log group identifier are active in response to the detection of the ending of the data consistency section.

Example 100 includes a method for inferring persistent memory type data, the method comprising loading, by a computing device, a nonvolatile region of a persistent memory of the computing device, wherein the nonvolatile region includes a type metadata region, a root map region, and a data region; identifying, by the computing device, a root object within the data region of the nonvolatile region using the root map region; identifying, by the computing device, a type of the root object within the type metadata region using the root map region; and recursively interpreting, by the computing device, the root object as a function of the root object and the type of the root object, wherein recursively interpreting the root object comprises retrieving a type definition of the type of the root object from the type metadata region of the nonvolatile region of the persistent memory; determining bounds of the root object as a function of the type definition; identifying one or more variables within the root object as a function of the type definition, wherein identifying a variable comprises determining bounds of the variable and a type of the variable; and recursively interpreting each object referenced by a variable of the variables within the root object as a function of the object referenced by the variable and the type of the reference variable.

Example 101 includes the subject matter of Example 100, and wherein determining the bounds of the root object comprises determining a start address of the root object and a size of the root object; and determining the bounds of the variable comprises determining an offset of the reference variable from the start address of the root object.

Example 102 includes the subject matter of any of Examples 100 and 101, and wherein recursively interpreting the root object comprises dynamically generating code to access the root object; and dynamically generating code to access each of the one or more variables within the root object.

Example 103 includes the subject matter of any of Examples 100-102, and wherein recursively interpreting the root object comprises generating a static type definition of the type of the root object; and generating a static type definition of the type of each reference variable of the variables within the root object.

Example 104 includes the subject matter of any of Examples 100-103, and further including determining, by the computing device, domain-specific semantics of the type of the root object in response to recursively interpreting the root object.

Example 105 includes a computing device comprising a processor; and a memory having stored therein a plurality of instructions that when executed by the processor cause the computing device to perform the method of any of Examples 53-104.

Example 106 includes one or more machine readable storage media comprising a plurality of instructions stored thereon that in response to being executed result in a computing device performing the method of any of Examples 53-104.

Example 107 includes a computing device comprising means for performing the method of any of Examples 53-104.

Example 108 includes a computing device for persistent memory pointer access, the computing device comprising means for assigning a first virtual memory address of a target memory location to a persistent memory pointer using a persistent pointer strategy, wherein the target memory location is within a nonvolatile region of a persistent memory of the computing device, and wherein the persistent memory pointer is within the persistent memory of the computing device; and means for dereferencing the persistent memory pointer to generate a second virtual memory address of the target memory location using the persistent pointer strategy.

Example 109 includes the subject matter of Example 108, and wherein the persistent pointer strategy comprises an off-holder strategy that translates between virtual memory addresses and persistent pointer values based on a difference between virtual memory addresses.

Example 110 includes the subject matter of any of Examples 108 and 109, and wherein the persistent memory pointer is within the nonvolatile region of the persistent memory; the means for assigning the first virtual memory address of the target memory location to the persistent memory pointer comprises means for storing a difference between the first virtual memory address of the target memory location and a third virtual memory address of the persistent memory pointer into the persistent memory pointer; and the means for dereferencing the persistent memory pointer to generate the second virtual memory address comprises means for adding the persistent memory pointer to a fourth virtual memory address of the persistent memory pointer.

Example 111 includes the subject matter of any of Examples 108-110, and wherein the first virtual memory address equals the second virtual memory address and the third virtual memory address equals the fourth virtual memory address.

Example 112 includes the subject matter of any of Examples 108-111, and wherein the first virtual memory address does not equal the second virtual memory address and the third virtual memory address does not equal the fourth virtual memory address.

Example 113 includes the subject matter of any of Examples 108-112, and wherein the persistent pointer strategy comprises an ID-in-value strategy that stores a region ID in the persistent pointer value.

Example 114 includes the subject matter of any of Examples 108-113, and further including means for opening the nonvolatile region of the persistent memory, wherein the nonvolatile region has a virtual base address and a region ID; means for storing, in response to opening the nonvolatile region, the region ID of the nonvolatile region in a region ID table of the persistent memory indexed by the virtual base address; and means for storing, in response to opening the nonvolatile region, the virtual base address of the nonvolatile region in a nonvolatile base address table of the persistent memory indexed by the region ID.

Example 115 includes the subject matter of any of Examples 108-114, and wherein the persistent memory pointer is within a second nonvolatile region of the persistent memory, different from the nonvolatile region.

Example 116 includes the subject matter of any of Examples 108-115, and wherein the means for storing the region ID in the region ID table comprises means for determining a virtual row address within the persistent memory as a function of the virtual base address; and means for storing the region ID in the persistent memory at the virtual row address.

Example 117 includes the subject matter of any of Examples 108-116, and wherein the means for determining the virtual row address comprises means for determining a nonvolatile base by performing a bitwise AND operation on the virtual base address and a first binary value, wherein the first binary value includes a most-significant first number of bits set to zero, a next-most-significant second number of bits set to one, and a least-significant third number of bits set to zero; means for right-shifting the nonvolatile base by a difference between the third number of bits and a fourth number of bits, wherein the region ID is represented within the fourth number of bits and the fourth number of bits is less than the third number of bits; and means for determining the virtual row address by performing a bitwise OR operation on the right-shifted nonvolatile base and a second binary value, wherein the second binary value includes the most-significant first number of bits set to one and a remaining number of bits set to zero.

Example 118 includes the subject matter of any of Examples 108-117, and wherein the means for storing the virtual base address in the nonvolatile base address table comprises means for determining a virtual row address within the persistent memory as a function of the region ID; and means for storing the virtual base address in the persistent memory at the virtual row address.

Example 119 includes the subject matter of any of Examples 108-118, and wherein the virtual base address comprises a most-significant first number of bits set to one, a next-most-significant second number of bits, and a least-significant third number of bits set to zero; the region ID is represented within a fourth number of bits, wherein the fourth number of bits is less than the third number of bits; and the means for determining the virtual row address comprises means for left-shifting the region ID by the second number of bits; and means for determining the virtual row address by performing a bitwise OR operation on the left-shifted region ID and a first binary value, wherein the first binary value includes the most-significant first number of bits set to one, a next-most-significant fifth number of bits set to a second binary value, and a remaining number of bits set to zero, wherein the fifth number of bits equals the third number of bits minus the fourth number of bits, and wherein the second binary value includes all bits set to zero except for a least-significant bit set to one.

Example 120 includes the subject matter of any of Examples 108-119, and wherein the means for assigning the first virtual memory address of the target memory location to the persistent memory pointer comprises means for determining the virtual base address of the nonvolatile region as a function of the first virtual memory address; means for looking up the region ID of the nonvolatile region from the region ID table using the virtual base address; means for determining an offset value as a function of the first virtual memory address; means for determining a persistent pointer value as a function of the region ID of the nonvolatile region and the offset value; and means for storing the persistent pointer value in the persistent memory pointer.

Example 121 includes the subject matter of any of Examples 108-120, and wherein the means for looking up the region ID comprises means for determining a virtual row address and reading the persistent memory at the virtual row address, wherein the means for determining the virtual row address comprises means for determining a nonvolatile base by performing a bitwise AND operation on the first virtual memory address and a first binary value, wherein the first binary value includes a most-significant first number of bits set to zero, a next-most-significant second number of bits set to one, and a least-significant third number of bits set to zero; means for right-shifting the nonvolatile base by a difference between the third number of bits and a fourth number of bits, wherein the region ID is represented within the fourth number of bits and the fourth number of bits is less than the third number of bits; and means for determining the virtual row address by performing a bitwise OR operation on the right-shifted nonvolatile base and a second binary value, wherein the second binary value includes the most-significant first number of bits set to one and a remaining number of bits set to zero; the means for determining the offset value comprises means for performing a bitwise AND operation on the first virtual memory address and a third binary value, wherein the third binary value includes the most-significant first number of bits set to zero, the next-most-significant second number of bits set to zero, and the least-significant third number of bits set to one; and the means for determining the persistent pointer value comprises means for left-shifting the region ID by the third number of bits; and means for performing a bitwise OR operation on the left-shifted region ID and the offset value.

Example 122 includes the subject matter of any of Examples 108-121, and wherein the means for dereferencing the persistent memory pointer to generate the second virtual memory address comprises means for determining the region ID of the nonvolatile region as a function of a persistent pointer value of the persistent memory pointer; means for looking up the virtual base address of the nonvolatile region from the virtual base address table using the region ID; means for determining an offset value as a function of the persistent pointer value; and means for determining the second virtual memory address as a function of the offset value and the virtual base address.

Example 123 includes the subject matter of any of Examples 108-122, and wherein the virtual base address comprises a most-significant first number of bits set to one, a next-most-significant second number of bits, and a least-significant third number of bits; the region ID is represented within a fourth number of bits, wherein the fourth number of bits is less than the third number of bits; the means for looking up the virtual base address comprises means for determining a virtual row address and reading the persistent memory at the virtual row address, wherein the means for determining the virtual row address comprises means for left-shifting the region ID by the second number of bits; and means for determining the virtual row address by performing a bitwise OR operation on the left-shifted region ID and a first binary value, wherein the first binary value includes the most-significant first number of bits set to one, a next-most-significant fifth number of bits set to a second binary value, and a remaining number of bits set to zero, wherein the fifth number of bits equals the third number of bits minus the fourth number of bits, and wherein the second binary value includes all bits set to zero except for a least-significant bit set to one; the means for determining the offset value comprises means for performing a bitwise AND operation on the persistent pointer value and a third binary value, wherein the third binary value includes the most-significant first number of bits set to zero, the next-most-significant second number of bits set to zero, and the least-significant third number of bits set to one; and the means for determining the second virtual memory address comprises means for performing a bitwise OR operation on the virtual base address and the offset value.

Example 124 includes the subject matter of any of Examples 108-123, and wherein the persistent pointer strategy comprises (i) an optimistic rectification strategy to update persistent pointer values based on a stored virtual base address upon opening the nonvolatile region or (ii) a pessimistic rectification strategy to update the persistent pointer value based on a stored virtual base address upon accessing the persistent pointer value.

Example 125 includes the subject matter of any of Examples 108-124, and further including means for opening, by the computing device, the nonvolatile region of the persistent memory in an optimistic mode or a pessimistic mode, wherein the nonvolatile region has a stored virtual base address, wherein the means for opening the nonvolatile region comprises means for determining whether the nonvolatile region may be mapped to a virtual base address equal to the stored virtual base address; means for mapping the nonvolatile region to the virtual base address equal to the stored virtual base address in response to determining that the nonvolatile region may be mapped to the stored virtual base address; means for mapping the nonvolatile region to a new virtual base address in response to determining that the nonvolatile region may not be mapped to the stored virtual base address; and means for updating, in response to opening the nonvolatile region in the optimistic mode and mapping the nonvolatile region to the new virtual base address, each persistent pointer value in the nonvolatile region as a function of the new virtual base address.

Example 126 includes the subject matter of any of Examples 108-125, and wherein the persistent memory pointer is within the nonvolatile region; and the means for assigning the first virtual memory address of the target memory location to the persistent memory pointer comprises means for storing the first virtual memory address in the persistent memory pointer in response to opening the nonvolatile region in the optimistic mode; and means for, in response to opening the nonvolatile region in the pessimistic mode: (i) determining an offset between a current virtual base address of the nonvolatile region and the stored virtual base address, (ii) subtracting the offset from the first virtual memory address, and (iii) storing the difference in the persistent memory pointer.

Example 127 includes the subject matter of any of Examples 108-126, and wherein the means for dereferencing the persistent memory pointer to generate the second virtual memory address comprises means for retrieving the second virtual memory address from the persistent memory pointer in response to opening the nonvolatile region in the optimistic mode; and means for, in response to opening the nonvolatile region in the pessimistic mode: (i) determining an offset between a current virtual base address of the nonvolatile region and the stored virtual base address and (ii) adding the offset to a persistent pointer value of the persistent memory pointer to generate the second virtual memory address.

Example 128 includes a computing device for persistent memory data consistency, the computing device comprising means for monitoring executing code for a beginning of a data consistency section that has been previously identified within the executing code; means for recording the data consistency section as active in response to detecting the beginning of the data consistency section; means for logging changes to persistent memory in response to detecting the beginning of the data consistency section; means for monitoring the executing code for an ending of the data consistency section; means for committing the changes to the persistent memory atomically in response to detecting the ending of the data consistency section; and means for reversing the changes to the persistent memory in response to a failure of the computing device within the data consistency section.

Example 129 includes the subject matter of Example 128, and further including means for determining if no other data consistency sections are active in response to detecting the ending of the data consistency section; wherein the means for committing the changes comprises means for committing the changes to the persistent memory atomically in response to detecting the ending of the data consistency section and determining that no other data consistency sections are active.

Example 130 includes the subject matter of any of Examples 128 and 129, and wherein the means for recording the data consistency section as active comprises means for recording a log group identifier associated with the data consistency section; and the means for determining if no other data consistency sections are active comprises means for determining if no other data consistency sections associated with the log group identifier are active in response to detecting the ending of the data consistency section.

Example 131 includes a computing device for compiling source code with persistent memory support, the computing device comprising means for analyzing source code including a persistent memory pointer access; means for selecting a persistent pointer strategy in response to analyzing the source code; and means for generating, in response to analyzing the source code, output code for the persistent memory pointer access, wherein the output code is to cause a target computing device to assign a first virtual memory address of a target memory location to a persistent memory pointer using the persistent pointer strategy, wherein the target memory location is within a nonvolatile region of a persistent memory of the target computing device, and wherein the persistent memory pointer is within the persistent memory of the target computing device; and dereference the persistent memory pointer to generate a second virtual memory address of the target memory location using the persistent pointer strategy.

Example 132 includes the subject matter of Example 131, and wherein the means for selecting the persistent pointer strategy comprises means for selecting the persistent pointer strategy as a function of a programmer-specified pointer type defined in the source code.

Example 133 includes the subject matter of any of Examples 131 and 132, and wherein the persistent pointer strategy comprises an off-holder strategy that translates between virtual memory addresses and persistent pointer values based on a difference between virtual memory addresses.

Example 134 includes the subject matter of any of Examples 131-133, and wherein the persistent memory pointer is within the nonvolatile region of the persistent memory; to assign the first virtual memory address of the target memory location to the persistent memory pointer comprises to store a difference between the first virtual memory address of the target memory location and a third virtual memory address of the persistent memory pointer into the persistent memory pointer; and to dereference the persistent memory pointer to generate the second virtual memory address comprises to add the persistent memory pointer to a fourth virtual memory address of the persistent memory pointer.

Example 135 includes the subject matter of any of Examples 131-134, and wherein the first virtual memory address equals the second virtual memory address and the third virtual memory address equals the fourth virtual memory address.

Example 136 includes the subject matter of any of Examples 131-135, and wherein the first virtual memory address does not equal the second virtual memory address and the third virtual memory address does not equal the fourth virtual memory address.

Example 137 includes the subject matter of any of Examples 131-136, and wherein the persistent pointer strategy comprises an ID-in-value strategy that stores a region ID in the persistent pointer value.

Example 138 includes the subject matter of any of Examples 131-137, and wherein the output code is further to cause the target computing device to open the nonvolatile region of the persistent memory, wherein the nonvolatile region has a virtual base address and a region ID; store, in response to opening of the nonvolatile region, the region ID of the nonvolatile region in a region ID table of the persistent memory indexed by the virtual base address; and store, in response to the opening of the nonvolatile region, the virtual base address of the nonvolatile region in a nonvolatile base address table of the persistent memory indexed by the region ID.

Example 139 includes the subject matter of any of Examples 131-138, and wherein the persistent memory pointer is within a second nonvolatile region of the persistent memory, different from the nonvolatile region.

Example 140 includes the subject matter of any of Examples 131-139, and wherein to store the region ID in the region ID table comprises to determine a virtual row address within the persistent memory as a function of the virtual base address; and store the region ID in the persistent memory at the virtual row address.

Example 141 includes the subject matter of any of Examples 131-140, and wherein to determine the virtual row address comprises to determine a nonvolatile base by performance of a bitwise AND operation on the virtual base address and a first binary value, wherein the first binary value includes a most-significant first number of bits set to zero, a next-most-significant second number of bits set to one, and a least-significant third number of bits set to zero; right-shift the nonvolatile base by a difference between the third number of bits and a fourth number of bits, wherein the region ID is represented within the fourth number of bits and the fourth number of bits is less than the third number of bits; and determine the virtual row address by performance of a bitwise OR operation on the right-shifted nonvolatile base and a second binary value, wherein the second binary value includes the most-significant first number of bits set to one and a remaining number of bits set to zero.

Example 142 includes the subject matter of any of Examples 131-141, and wherein to store the virtual base address in the nonvolatile base address table comprises to determine a virtual row address within the persistent memory as a function of the region ID; and store the virtual base address in the persistent memory at the virtual row address.

Example 143 includes the subject matter of any of Examples 131-142, and wherein the virtual base address comprises a most-significant first number of bits set to one, a next-most-significant second number of bits, and a least-significant third number of bits set to zero; the region ID is represented within a fourth number of bits, wherein the fourth number of bits is less than the third number of bits; and to determine the virtual row address comprises to left-shift the region ID by the second number of bits; and determine the virtual row address by performance of a bitwise OR operation on the left-shifted region ID and a first binary value, wherein the first binary value includes the most-significant first number of bits set to one, a next-most-significant fifth number of bits set to a second binary value, and a remaining number of bits set to zero, wherein the fifth number of bits equals the third number of bits minus the fourth number of bits, and wherein the second binary value includes all bits set to zero except for a least-significant bit set to one.

Example 144 includes the subject matter of any of Examples 131-143, and wherein to assign the first virtual memory address of the target memory location to the persistent memory pointer comprises to determine the virtual base address of the nonvolatile region as a function of the first virtual memory address; look up the region ID of the nonvolatile region from the region ID table using the virtual base address; determine an offset value as a function of the first virtual memory address; determine a persistent pointer value as a function of the region ID of the nonvolatile region and the offset value; and store the persistent pointer value in the persistent memory pointer.

Example 145 includes the subject matter of any of Examples 131-144, and wherein to look up the region ID comprises to determine a virtual row address and read the persistent memory at the virtual row address, wherein to determine the virtual row address comprises to determine a nonvolatile base by performance of a bitwise AND operation on the first virtual memory address and a first binary value, wherein the first binary value includes a most-significant first number of bits set to zero, a next-most-significant second number of bits set to one, and a least-significant third number of bits set to zero; right-shift the nonvolatile base by a difference between the third number of bits and a fourth number of bits, wherein the region ID is represented within the fourth number of bits and the fourth number of bits is less than the third number of bits; and determine the virtual row address by performance of a bitwise OR operation on the right-shifted nonvolatile base and a second binary value, wherein the second binary value includes the most-significant first number of bits set to one and a remaining number of bits set to zero; to determine the offset value comprises to perform a bitwise AND operation on the first virtual memory address and a third binary value, wherein the third binary value includes the most-significant first number of bits set to zero, the next-most-significant second number of bits set to zero, and the least-significant third number of bits set to one; and to determine the persistent pointer value comprises to left-shift the region ID by the third number of bits; and perform a bitwise OR operation on the left-shifted region ID and the offset value.

Example 146 includes the subject matter of any of Examples 131-145, and wherein to dereference the persistent memory pointer to generate the second virtual memory address comprises to determine the region ID of the nonvolatile region as a function of a persistent pointer value of the persistent memory pointer; look up the virtual base address of the nonvolatile region from the virtual base address table using the region ID; determine an offset value as a function of the persistent pointer value; and determine the second virtual memory address as a function of the offset value and the virtual base address.

Example 147 includes the subject matter of any of Examples 131-146, and wherein the virtual base address comprises a most-significant first number of bits set to one, a next-most-significant second number of bits, and a least-significant third number of bits; the region ID is represented within a fourth number of bits, wherein the fourth number of bits is less than the third number of bits; to look up the virtual base address comprises to determine a virtual row address and read the persistent memory at the virtual row address, wherein to determine the virtual row address comprises to left-shift the region ID by the second number of bits; and determine the virtual row address by performance of a bitwise OR operation on the left-shifted region ID and a first binary value, wherein the first binary value includes the most-significant first number of bits set to one, a next-most-significant fifth number of bits set to a second binary value, and a remaining number of bits set to zero, wherein the fifth number of bits equals the third number of bits minus the fourth number of bits, and wherein the second binary value includes all bits set to zero except for a least-significant bit set to one; to determine the offset value comprises to perform a bitwise AND operation on the persistent pointer value and a third binary value, wherein the third binary value includes the most-significant first number of bits set to zero, the next-most-significant second number of bits set to zero, and the least-significant third number of bits set to one; and to determine the second virtual memory address comprises to perform a bitwise OR operation on the virtual base address and the offset value.

Example 148 includes the subject matter of any of Examples 131-147, and wherein the persistent pointer strategy comprises (i) an optimistic rectification strategy to update persistent pointer values based on a stored virtual base address upon opening the nonvolatile region or (ii) a pessimistic rectification strategy to update the persistent pointer value based on a stored virtual base address upon accessing the persistent pointer value.

Example 149 includes the subject matter of any of Examples 131-148, and wherein the output code is further to cause the target computing device to open the nonvolatile region of the persistent memory in an optimistic mode or a pessimistic mode, wherein the nonvolatile region has a stored virtual base address, wherein to open the nonvolatile region comprises to determine whether the nonvolatile region may be mapped to a virtual base address equal to the stored virtual base address; map the nonvolatile region to the virtual base address equal to the stored virtual base address in response to a determination that the nonvolatile region may be mapped to the stored virtual base address; map the nonvolatile region to a new virtual base address in response to a determination that the nonvolatile region may not be mapped to the stored virtual base address; and update, in response to opening of the nonvolatile region in the optimistic mode and mapping of the nonvolatile region to the new virtual base address, each persistent pointer value in the nonvolatile region as a function of the new virtual base address.

Example 150 includes the subject matter of any of Examples 131-149, and wherein the persistent memory pointer is within the nonvolatile region; and to assign the first virtual memory address of the target memory location to the persistent memory pointer comprises to store the first virtual memory address in the persistent memory pointer in response to opening of the nonvolatile region in the optimistic mode; and in response to opening of the nonvolatile region in the pessimistic mode: (i) determine an offset between a current virtual base address of the nonvolatile region and the stored virtual base address, (ii) subtract the offset from the first virtual memory address, and (iii) store the difference in the persistent memory pointer.

Example 151 includes the subject matter of any of Examples 131-150, and wherein to dereference the persistent memory pointer to generate the second virtual memory address comprises to retrieve the second virtual memory address from the persistent memory pointer in response to opening of the nonvolatile region in the optimistic mode; and in response to opening of the nonvolatile region in the pessimistic mode: (i) determine an offset between a current virtual base address of the nonvolatile region and the stored virtual base address and (ii) add the offset to a persistent pointer value of the persistent memory pointer to generate the second virtual memory address.

Example 152 includes a computing device for compiling source code with persistent memory data consistency support, the computing device comprising means for analyzing source code including a data consistency section that has been previously identified within the source code; and means for generating, in response to analyzing the source code, output code for the data consistency section, wherein the output code is to cause a target computing device to monitor executing code for a beginning of the data consistency section within the executing code; record the data consistency section as active in response to detection of the beginning of the data consistency section; log changes to persistent memory of the target computing device in response to the detection of the beginning of the data consistency section; monitor the executing code for an ending of the data consistency section; commit the changes to the persistent memory atomically in response to detection of the ending of the data consistency section; and reverse the changes to the persistent memory in response to a failure of the target computing device within the data consistency section.

Example 153 includes the subject matter of Example 152, and wherein the output code is further to cause the target computing device to determine if no other data consistency sections are active in response to the detection of the ending of the data consistency section; and wherein to commit the changes comprises to commit the changes to the persistent memory atomically in response to the detection of the ending of the data consistency section and a determination that no other data consistency sections are active.

Example 154 includes the subject matter of any of Examples 152 and 153, and wherein to record the data consistency section as active comprises to record a log group identifier associated with the data consistency section; and to determine if no other data consistency sections are active comprises to determine if no other data consistency sections associated with the log group identifier are active in response to the detection of the ending of the data consistency section.

Example 155 includes a computing device for inferring persistent memory type data, the computing device comprising means for loading a nonvolatile region of a persistent memory of the computing device, wherein the nonvolatile region includes a type metadata region, a root map region, and a data region; means for identifying a root object within the data region of the nonvolatile region using the root map region; means for identifying a type of the root object within the type metadata region using the root map region; and means for recursively interpreting the root object as a function of the root object and the type of the root object, wherein the means for recursively interpreting the root object comprises means for retrieving a type definition of the type of the root object from the type metadata region of the nonvolatile region of the persistent memory; means for determining bounds of the root object as a function of the type definition; means for identifying one or more variables within the root object as a function of the type definition, wherein identifying a variable comprises determining bounds of the variable and a type of the variable; and means for recursively interpreting each object referenced by a variable of the variables within the root object as a function of the object referenced by the variable and the type of the reference variable.

Example 156 includes the subject matter of Example 155, and wherein the means for determining the bounds of the root object comprises means for determining a start address of the root object and a size of the root object; and the means for determining the bounds of the variable comprises means for determining an offset of the reference variable from the start address of the root object.

Example 157 includes the subject matter of any of Examples 155 and 156, and wherein the means for recursively interpreting the root object comprises means for dynamically generating code to access the root object; and means for dynamically generating code to access each of the one or more variables within the root object.

Example 158 includes the subject matter of any of Examples 155-157, and wherein the means for recursively interpreting the root object comprises means for generating a static type definition of the type of the root object; and means for generating a static type definition of the type of each reference variable of the variables within the root object.

Example 159 includes the subject matter of any of Examples 155-158, and further including means for determining domain-specific semantics of the type of the root object in response to recursively interpreting the root object.

The invention claimed is:

1. A computing device for persistent memory pointer access, the computing device comprising:

a persistent memory, wherein the persistent memory comprises a byte-addressable nonvolatile memory device, and wherein the persistent memory includes a nonvolatile region;

a nonvolatile region management module to open the nonvolatile region in an optimistic mode or a pessimistic mode, wherein the nonvolatile region has a stored virtual base address; and a position-independent pointer module to:
assign a first virtual memory address of a target memory location to a persistent memory pointer using a persistent pointer strategy, wherein the target memory location is within the nonvolatile region of the persistent memory, wherein the persistent memory pointer is within the nonvolatile region in the persistent memory, and wherein to assign the first virtual memory address comprises to (i) store the first virtual memory address in the persistent memory pointer in response to opening of the nonvolatile region in the optimistic mode, and (ii) in response to opening of the nonvolatile region in the pessimistic mode, determine an offset between a current virtual base address of the nonvolatile region and the stored virtual base address, subtract the offset from the first virtual memory address, and store the difference in the persistent memory pointer; and dereference the persistent memory pointer to generate a second virtual memory address of the target memory location using the persistent pointer strategy.

2. The computing device of claim 1, wherein the persistent pointer strategy comprises an off-holder strategy that translates between virtual memory addresses and persistent pointer values based on a difference between virtual memory addresses.

3. The computing device of claim 2, wherein:
the persistent memory pointer is within the nonvolatile region of the persistent memory;
to assign the first virtual memory address of the target memory location to the persistent memory pointer comprises to store a difference between the first virtual memory address of the target memory location and a third virtual memory address of the persistent memory pointer into the persistent memory pointer; and
to dereference the persistent memory pointer to generate the second virtual memory address comprises to add the persistent memory pointer to a fourth virtual memory address of the persistent memory pointer.

4. The computing device of claim 1, wherein the persistent pointer strategy comprises an ID-in-value strategy that stores a region ID in the persistent pointer value.

5. The computing device of claim 4, further comprising a nonvolatile region management module to:
open the nonvolatile region of the persistent memory, wherein the nonvolatile region has a virtual base address and a region ID;
store, in response to opening of the nonvolatile region, the region ID of the nonvolatile region in a region ID table of the persistent memory indexed by the virtual base address; and
store, in response to the opening of the nonvolatile region, the virtual base address of the nonvolatile region in a nonvolatile base address table of the persistent memory indexed by the region ID.

6. The computing device of claim 5, wherein to store the region ID in the region ID table comprises to:

determine a virtual row address within the persistent memory as a function of the virtual base address; and
store the region ID in the persistent memory at the virtual row address.

7. The computing device of claim 5, wherein to store the virtual base address in the nonvolatile base address table comprises to:
determine a virtual row address within the persistent memory as a function of the region ID; and
store the virtual base address in the persistent memory at the virtual row address.

8. The computing device of claim 5, wherein to assign the first virtual memory address of the target memory location to the persistent memory pointer comprises to:
determine the virtual base address of the nonvolatile region as a function of the first virtual memory address;
look up the region ID of the nonvolatile region from the region ID table using the virtual base address;
determine an offset value as a function of the first virtual memory address;
determine a persistent pointer value as a function of the region ID of the nonvolatile region and the offset value; and
store the persistent pointer value in the persistent memory pointer.

9. The computing device of claim 5, wherein to dereference the persistent memory pointer to generate the second virtual memory address comprises to:
determine the region ID of the nonvolatile region as a function of a persistent pointer value of the persistent memory pointer;
look up the virtual base address of the nonvolatile region from the virtual base address table using the region ID;
determine an offset value as a function of the persistent pointer value; and
determine the second virtual memory address as a function of the offset value and the virtual base address.

10. The computing device of claim 1, wherein the persistent pointer strategy comprises (i) an optimistic rectification strategy to update persistent pointer values based on the stored virtual base address upon opening the nonvolatile region or (ii) a pessimistic rectification strategy to update the persistent pointer value based on the stored virtual base address upon accessing the persistent pointer value.

11. The computing device of claim 10, wherein to open the nonvolatile region comprises to:
determine whether the nonvolatile region may be mapped to a virtual base address equal to the stored virtual base address;
map the nonvolatile region to the virtual base address equal to the stored virtual base address in response to a determination that the nonvolatile region may be mapped to the stored virtual base address;
map the nonvolatile region to a new virtual base address in response to a determination that the nonvolatile region may not be mapped to the stored virtual base address; and
update, in response to opening of the nonvolatile region in the optimistic mode and mapping of the nonvolatile region to the new virtual base address, each persistent pointer value in the nonvolatile region as a function of the new virtual base address.

12. A method for persistent memory pointer access, the method comprising:
opening, by a computing device, a nonvolatile region of a persistent memory of the computing device in an optimistic mode or a pessimistic mode, wherein the nonvolatile region has a stored virtual base address;

assigning, by the computing device, a first virtual memory address of a target memory location to a persistent memory pointer using a persistent pointer strategy, wherein the target memory location is within the nonvolatile region, wherein the persistent memory comprises a byte-addressable nonvolatile memory device of the computing device, wherein the persistent memory pointer is within the nonvolatile region in the persistent memory of the computing device, and wherein assigning the first virtual memory address comprises:

storing the first virtual memory address in the persistent memory pointer in response to opening the nonvolatile region in the optimistic mode; and in response to opening the nonvolatile region in the pessimistic mode: (i) determining an offset between a current virtual base address of the nonvolatile region and the stored virtual base address, (ii) subtracting the offset from the first virtual memory address, and (iii) storing the difference in the persistent memory pointer; and dereferencing, by the computing device, the persistent memory pointer to generate a second virtual memory address of the target memory location using the persistent pointer strategy.

13. The method of claim 12, wherein the persistent pointer strategy comprises an off-holder strategy that translates between virtual memory addresses and persistent pointer values based on a difference between virtual memory addresses.

14. The method of claim 13, wherein:

the persistent memory pointer is within the nonvolatile region of the persistent memory;

assigning the first virtual memory address of the target memory location to the persistent memory pointer comprises storing a difference between the first virtual memory address of the target memory location and a third virtual memory address of the persistent memory pointer into the persistent memory pointer; and dereferencing the persistent memory pointer to generate the second virtual memory address comprises adding the persistent memory pointer to a fourth virtual memory address of the persistent memory pointer.

15. The method of claim 12, wherein the persistent pointer strategy comprises an ID-in-value strategy that stores a region ID in the persistent pointer value.

16. The method of claim 15, further comprising:

opening, by the computing device, the nonvolatile region of the persistent memory, wherein the nonvolatile region has a virtual base address and a region ID;

storing, by the computing device in response to opening the nonvolatile region, the region ID of the nonvolatile region in a region ID table of the persistent memory indexed by the virtual base address; and storing, by the computing device in response to opening the nonvolatile region, the virtual base address of the nonvolatile region in a nonvolatile base address table of the persistent memory indexed by the region ID.

17. The method of claim 12, wherein the persistent pointer strategy comprises (i) an optimistic rectification strategy to update persistent pointer values based on the stored virtual base address upon opening the nonvolatile region or (ii) a pessimistic rectification strategy to update the persistent pointer value based on the stored virtual base address upon accessing the persistent pointer value.

18. One or more computer-readable storage media comprising a plurality of instructions that in response to being executed cause a computing device to:

open a nonvolatile region of a persistent memory of the computing device in an optimistic mode or a pessimistic mode, wherein the nonvolatile region has a stored virtual base address;

assign a first virtual memory address of a target memory location to a persistent memory pointer using a persistent pointer strategy, wherein the target memory location is within the nonvolatile region, wherein the persistent memory comprises a byte-addressable nonvolatile memory device of the computing device, wherein the persistent memory pointer is within the nonvolatile region in the persistent memory of the computing device, and wherein to assign the first virtual memory address comprises to:

store the first virtual memory address in the persistent memory pointer in response to opening the nonvolatile region in the optimistic mode; and in response to opening the nonvolatile region in the pessimistic mode: (i) determine an offset between a current virtual base address of the nonvolatile region and the stored virtual base address, (ii) subtract the offset from the first virtual memory address, and (iii) store the difference in the persistent memory pointer; and dereference the persistent memory pointer to generate a second virtual memory address of the target memory location using the persistent pointer strategy.

19. The one or more computer-readable storage media of claim 18, wherein the persistent pointer strategy comprises an off-holder strategy that translates between virtual memory addresses and persistent pointer values based on a difference between virtual memory addresses.

20. The one or more computer-readable storage media of claim 19, wherein:

the persistent memory pointer is within the nonvolatile region of the persistent memory;

to assign the first virtual memory address of the target memory location to the persistent memory pointer comprises to store a difference between the first virtual memory address of the target memory location and a third virtual memory address of the persistent memory pointer into the persistent memory pointer; and to dereference the persistent memory pointer to generate the second virtual memory address comprises to add the persistent memory pointer to a fourth virtual memory address of the persistent memory pointer.

21. The one or more computer-readable storage media of claim 18, wherein the persistent pointer strategy comprises an ID-in-value strategy that stores a region ID in the persistent pointer value.

22. The one or more computer-readable storage media of claim 21, further comprising a plurality of instructions that in response to being executed cause the computing device to:

open the nonvolatile region of the persistent memory, wherein the nonvolatile region has a virtual base address and a region ID;

store, in response to opening the nonvolatile region, the region ID of the nonvolatile region in a region ID table of the persistent memory indexed by the virtual base address; and store, in response to opening the nonvolatile region, the virtual base address of the nonvolatile region in a nonvolatile base address table of the persistent memory indexed by the region ID.

23. The one or more computer-readable storage media of claim 18, wherein the persistent pointer strategy comprises (i) an optimistic rectification strategy to update persistent pointer values based on the stored virtual base address upon opening the nonvolatile region or (ii) a pessimistic rectification strategy to update the persistent pointer value based on the stored virtual base address upon accessing the persistent pointer value.

24. The one or more computer-readable storage media of claim 23,
 wherein to open the nonvolatile region comprises to:
  determine whether the nonvolatile region may be mapped to a virtual base address equal to the stored virtual base address;
  map the nonvolatile region to the virtual base address equal to the stored virtual base address in response to determining that the nonvolatile region may be mapped to the stored virtual base address;
  map the nonvolatile region to a new virtual base address in response to determining that the nonvolatile region may not be mapped to the stored virtual base address; and
  update, in response to opening the nonvolatile region in the optimistic mode and mapping the nonvolatile region to the new virtual base address, each persistent pointer value in the nonvolatile region as a function of the new virtual base address.

* * * * *